United States Patent
Kundu et al.

(10) Patent No.: US 12,047,013 B2
(45) Date of Patent: Jul. 23, 2024

(54) MOTOR DRIVE TOPOLOGIES FOR TRACTION AND CHARGING IN ELECTRIFIED VEHICLES

(71) Applicants: MAGNA INTERNATIONAL INC., Aurora (CA); UNIVERSITY OF WINDSOR, Windsor (CA)

(72) Inventors: Animesh Kundu, Windsor (CA); Aiswarya Balamurali, Windsor (CA); Himavarsha Dhulipati, Windsor (CA); Narayan Chandra Kar, Windsor (CA); Lakshmi Varaha Iyer, Troy, MI (US); Gerd Schlager, St. Valentin (AT); Philip Korta, Troy, MI (US); Wolfgang Baeck, St. Valentin (AT)

(73) Assignees: Magna International Inc., Aurora (CA); University of Windsor, Windsor (CA)

( * ) Notice: Subject to any disclaimer, the term of this patent is extended or adjusted under 35 U.S.C. 154(b) by 19 days.

(21) Appl. No.: 17/605,385

(22) PCT Filed: Apr. 24, 2020

(86) PCT No.: PCT/US2020/029784
§ 371 (c)(1),
(2) Date: Oct. 21, 2021

(87) PCT Pub. No.: WO2020/219857
PCT Pub. Date: Oct. 29, 2020

(65) Prior Publication Data
US 2022/0216806 A1 Jul. 7, 2022

Related U.S. Application Data

(60) Provisional application No. 62/861,020, filed on Jun. 13, 2019, provisional application No. 62/838,538, filed on Apr. 25, 2019.

(51) Int. Cl.
*H02P 27/08* (2006.01)
*B60L 15/00* (2006.01)
(Continued)

(52) U.S. Cl.
CPC ....... *H02M 7/53871* (2013.01); *B60L 15/007* (2013.01); *H02M 1/0058* (2021.05);
(Continued)

(58) Field of Classification Search
CPC ........... H02M 7/53871; H02M 1/0058; H02M 1/084; B60L 15/007; B60L 2210/44; H02P 27/08
See application file for complete search history.

(56) References Cited

U.S. PATENT DOCUMENTS

| 6,842,354 B1* | 1/2005 | Tallam | H02M 7/483 |
| | | | 363/132 |
| 2006/0197491 A1* | 9/2006 | Nojima | H02M 7/487 |
| | | | 318/801 |

(Continued)

*Primary Examiner* — Rina I Duda
(74) *Attorney, Agent, or Firm* — Dickinson Wright PLLC

(57) ABSTRACT

A motor drive system for an electrified vehicle includes a DC source, such as a battery, and an inverter, which includes one or more phase drivers, each configured to switch current from the DC source to generate AC power upon one or more output terminals using a hybrid of two or more different solid-state switches, each having a corresponding voltage rating. A nine-switch inverter includes three phase drivers, each including high, low, and middle solid-state switches, with Si-MOSFET high and low switches having a first voltage rating of half of the rated voltage of the system, and with Gallium Nitride (GaN) transistors rated to block a full rated voltage of the system used for the middle switches. A delay driver synchronizes timing between two different solid-state switches by energizing control terminals at dif- (Continued)

ferent rates. The inverter can be operated using near-state pulse-width modulation (NSPWM) to reduce switching losses.

5 Claims, 11 Drawing Sheets

(51) Int. Cl.
*H02M 1/00* (2006.01)
*H02M 1/084* (2006.01)
*H02M 7/5387* (2007.01)

(52) U.S. Cl.
CPC ............ *H02M 1/084* (2013.01); *H02P 27/08* (2013.01); *B60L 2210/44* (2013.01)

(56) References Cited

U.S. PATENT DOCUMENTS

| | | |
|---|---|---|
| 2012/0221183 A1 | 8/2012 | Wu et al. |
| 2013/0094260 A1 | 4/2013 | Martini et al. |
| 2014/0355323 A1* | 12/2014 | Feldtkeller .......... H02M 7/5387 363/132 |
| 2016/0099665 A1* | 4/2016 | Chen ................ H02M 7/53871 363/56.02 |
| 2017/0085125 A1* | 3/2017 | Ghosh .................... H02M 1/32 |
| 2017/0257022 A1* | 9/2017 | Bryant ................. H02M 1/088 |

* cited by examiner

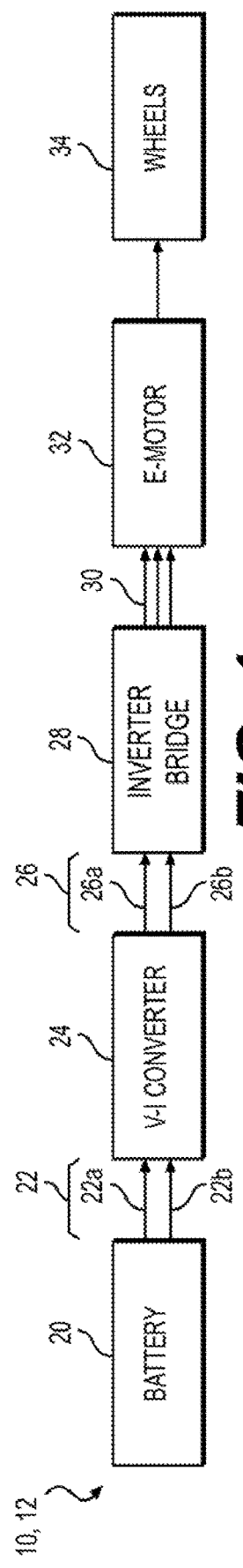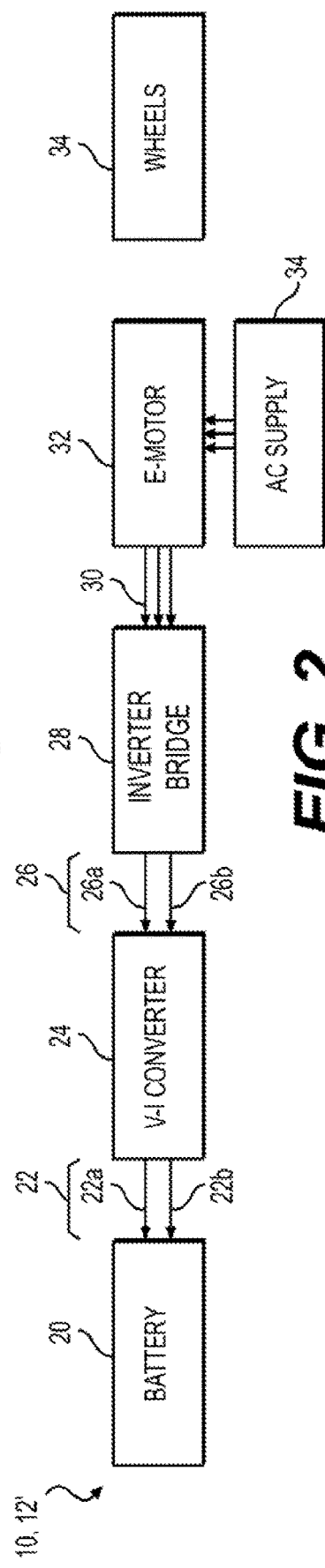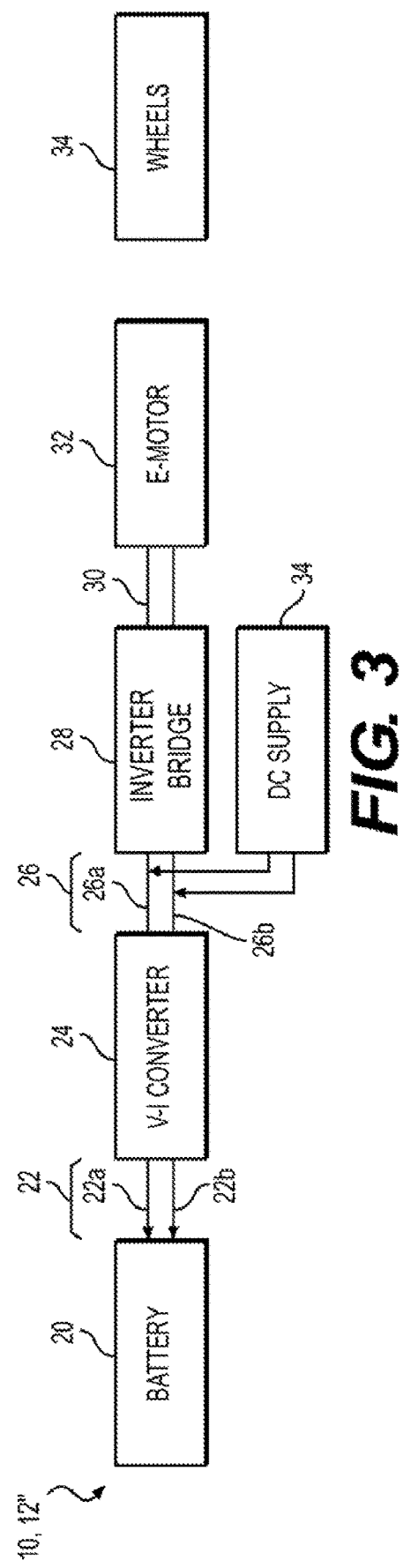

US 12,047,013 B2

MOTOR DRIVE TOPOLOGIES FOR TRACTION AND CHARGING IN ELECTRIFIED VEHICLES

CROSS-REFERENCE TO RELATED APPLICATIONS

This U.S. National Stage Patent Application claims the benefit of PCT International Patent Application Serial No. PCT/US2020/029784 filed Apr. 24, 2020 entitled "MOTOR DRIVE TOPOLOGIES FOR TRACTION AND CHARGING IN ELECTRIFIED VEHICLES" which claims the benefit of and priority to U.S. Provisional Patent Application Ser. No. 62/838,538, filed Apr. 25, 2019, titled "Motor Drive Topologies For Electrified Vehicles," and U.S. Provisional Patent Application Ser. No. 62/861,020, filed Jun. 13, 2019, titled "Inverter For Electric Motor Drive," the entire disclosures of these applications are hereby incorporated by reference.

FIELD

The present disclosure relates generally to inverters for converting direct current (DC) electrical power to alternating current (AC). More specifically, the present disclosure relates to such inverters for use in motor drive systems to power traction motors in electrified vehicles and to convert AC to DC for regenerative braking and charging a battery pack.

BACKGROUND

Inverters are electrical devices used to convert direct current (DC) electrical power to alternating current (AC) and vice-versa. One specific application of inverters is in electric motor drives, also known as variable frequency drives (VFDs) that are used in a variety of applications to provide alternating current (AC) electrical power to an electric motor. Motor drives including inverters are frequently used for powering traction motors in electric vehicles (EVs), such as battery electric vehicles, hybrid electric vehicles (HEVs), and plug-in hybrid electric vehicles (PHEVs). It is desirable to improve efficiency of a traction drive system that includes both the motor drive and the electric motor to reduce energy consumption from the vehicle's battery and to extend driving range.

Conventional electric motor drives generally rely upon solid-state switches to switch a battery via pulse width modulation (PWM) in order to approximate an alternating current waveform on one or more output terminals providing power to the electric motor. Historically, insulated gate bipolar transistors (IGBTs) or metal-oxide-semiconductor field-effect transistors (MOSFETs) are used as the switches. Conventional switching transistors using a silicon substrate have a bandgap of 1.1 electron-volt (eV). Conventional switching transistors are not generally able to operate at more than 10 kHz to switch the high electrical currents required for motor drive applications.

Wide-bandgap (WBG) devices, such as Silicon carbide (SiC) transistors or Gallium nitride (GaN) transistors have been used recently in motor drive applications to provide high switching frequency operation, with reduced form factor, switching losses and reduced motor harmonic loss and DC bus ripple. Costs of the WBG devices are relatively high when compared with conventional solid-state switches such as silicon IGBTs or MOSFETs, which increases the inverter cost. High frequency operation of the motor drive can trigger parasitic components present at the bus bar, across the power electronic device and device module with respect to ground, which causes additional disturbances in the voltage and current waveforms as electromagnetic interference (EMI). Due to pulse width modulation (PWM) and parasitic components, conventional inverters generate common mode noise with respect to the ground. Also, the common mode voltage causes a shaft voltage in a shaft of a motor connected to the motor drive. Such shaft voltage can cause bearing currents when the shaft voltage exceeds a breakdown voltage level of the bearing grease in the motor. Passive filters are traditionally used at the input or output of the inverter to minimize these issues. However, passive filters increase cost, loss, volume and weight of the system.

In some applications, electric motor drives may also be used to convert AC power to DC power for charging a battery pack in a vehicle. The AC power may be supplied by the electric motor, for example, in a regenerative braking mode. Alternatively or additionally, the AC power may be supplied by an external source, such as a fixed charging station attached to the utility power grid.

SUMMARY

According to some embodiments, an inverter for converting between direct current (DC) and alternating current (AC) power includes a phase driver configured to switch current from the DC source to generate the AC power upon an output terminal. The phase driver includes a first solid-state switch having a first voltage rating and a second solid-state switch having a second voltage rating higher than the first voltage rating.

BRIEF DESCRIPTION OF THE DRAWINGS

Further details, features and advantages of designs of the invention result from the following description of embodiment examples in reference to the associated drawings.

FIG. 1 is a block diagram of a first motor drive system in accordance with some embodiments of the present disclosure;

FIG. 2 is a block diagram of a second motor drive system in accordance with some embodiments of the present disclosure;

FIG. 3 is a block diagram of a third motor drive system in accordance with some embodiments of the present disclosure;

DETAILED DESCRIPTION

Figure 4:
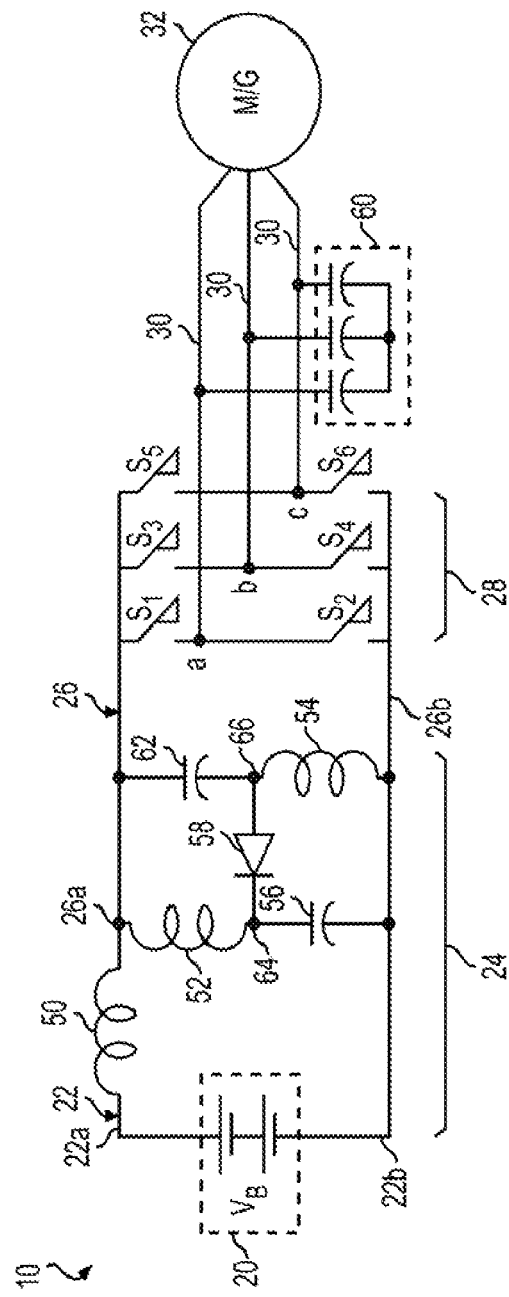
FIG. 4 is a schematic diagram of a motor drive in accordance with some embodiments of the present disclosure.

Recurring features are marked with identical reference numerals in the figures, in which example embodiments of an electric motor drive system 10 are is disclosed.

In some embodiments, and as shown in the block diagrams of FIGS. 1-3, the motor drive system 10 operates as a current source inverter (CSI), which is configured to supply a relative constant electrical current. Details of the operation of the motor drive system are explained below.

Current source inverters (CSI) offer several advantages over voltage source inverters (VSI) used in conventional motor drives, particularly when used with wide bandgap (WBG) based switches. For example, high switching frequency of WBG devices may allow for reduced sizing of inductive components in the CSI when compared with CSI designs that use conventional silicon-based (Si) devices for switching.

Advantages of using a CSI include, improved efficiency of the motor drive system 10, as a result of high switching frequency and high switching speeds of WBG switches, while also reducing electromagnetic interference (EMI) when compared with conventional VSI designs. Specifically, a CSI may provide attenuated EMI because the CSI includes a DC bus inductor, which serves as a low-pass filter to suppress common-mode current. This can provide substantial improvements over conventional VSI designs, such as a 2 level VSI with 6 WBG switches, especially when operating at high frequencies, which otherwise may require very large EMI filters to reduce electromagnetic interference (EMI) and dv/dt at the motor terminals. Such large EMI filters can add weight and cost such that they may be unfeasible for use in electrified vehicles. For example, an EMI filter designed for a VSI with an operating frequency of 200 kHz was 23 times larger than one designed for 20 kHz.

Another advantage of using a CSI over a VSI pertains to DC link capacitors: conventional VSI designs typically include a DC link capacitor at the input. DC link capacitors size can be decreased up to a threshold switching frequency, above which the capacitor size does not decrease much as it is designed based on the root-mean square (RMS) current rating instead of its capacitance. Hence, VSI designs may not be able to realize power density improvements that are theoretically possible. Another advantage of using a CSI over a VSI is for fault tolerance: the DC bus inductor of a CSI naturally limits the rate of fault current increases, giving the CSI a long-acknowledged advantage in fault robustness compared to VSIs.

Another advantage of using a CSI over a VSI pertains to output voltage: A CSI may produce an output voltage waveform of the CSI that is nearly sinusoidal with minimal ripple due to the presence of output filter capacitors. Such a high-quality output voltage waveform helps to reduce losses and reduces dv/dt in the electric motor. The high-quality output voltage output waveform may also reduce deterioration and failure in the insulation within the electric motor, and may allow the drive system 10 to be used with electric motors having reduced winding insulation when compared with electric motors designed to withstand high dv/dt from use with a conventional VSI. Another advantage of using a CSI over a VSI pertains to Boost capability: a CSI can provide the capability to boost the output voltage to a higher level than the source voltage. This may enable the electric motor to operate at higher base speed and/or with a higher constant power region.

Referring to FIG. 1, a block diagram showing a motor drive system 10 having a first configuration 12 is provided. The motor drive system 10 may be used within an electrified vehicle, such as battery electric vehicle (EV) or a plug-in hybrid electric vehicle (PHEV). The motor drive system 10 is configured to provide AC power to an electric motor 32, which is operable in a traction mode to transmit torque to wheels 34 for propelling the electrified vehicle. In some embodiments, the electric motor 32 may be a motor/generator (M/G), which is operable as either a motor or as a generator to generate electrical current. The motor drive system 10 includes a battery bus 22 for connection to a battery 20 including one or more battery cells or groups of battery cells. In some embodiments, one or more other storage devices or systems capable of supplying direct current (DC) electrical power, such as super-capacitors may be used instead of or in addition to the battery 20. The battery bus 22 includes a positive source node 22a and a reference source node 22b and is configured to provide a first DC electrical power having a substantially constant voltage.

The motor drive system 10 also includes a voltage-to-current (V-I) converter 24, which is operable in the traction mode to receive the first DC electrical power from the battery bus 22 and to supply a second DC electrical power having a substantially constant current upon a DC link bus 26 including a high-side conductor 26a and a low-side conductor 26b. The motor drive system 10 also includes a current-source inverter (CSI) 28, which may also be called an inverter bridge 28, including a plurality of solid-state switches configured to generate an AC power upon one or more motor leads 30 by selectively switching the second DC electrical power from the DC link bus 26. The inverter bridge 28 may also function to rectify AC power from the one or more motor leads 30 to supply DC electrical power to the DC link bus 26 for charging the battery 20.

In some embodiments, the V-I converter 24 is operable in a charging mode to receive power from the DC link bus 26 and to supply power to the battery bus 22 to the battery 20 connected thereto. For example, FIG. 2 shows a block diagram of the motor drive system 10 having a second configuration 12', in which an alternating current (AC) supply 36 is connected to windings of the electric motor 32 in order to energize the motor leads 30. The AC supply 36 may be an external supply, such as a fixed charging station or utility grid supply providing AC power to the electrified vehicle. The AC supply 36 is shown as a 3-phase supply having three power conductors, however, the AC supply 36 may have other configurations such as a single-phase configuration.

Alternatively or additionally, the motor drive system 10 may operate in a regenerative mode to convert AC power induced in the windings of the electric motor 32 to supply power to the battery 20. Such a regenerative mode may operate similarly to the second configuration 12' shown in FIG. 2, except with power being transferred from the wheels 34 to the electric motor 32, and without the external AC supply 36. In some embodiments, and as shown in FIG. 3, a DC supply 38 may be coupled to the DC link bus 26 to supply DC electrical current, which may be used to charge the battery 20.

In some embodiments, each of the solid-state switches in the inverter bridge 28 are wide-bandgap (WBG) devices having a bandgap greater than 2.0 electron-volts (eV). In some embodiments, each of the solid-state switches in the inverter bridge 28 may have a bandgap of between 2 and 4 electron-volts (eV). For example, each of the solid-state switches in the inverter bridge 28 may be Silicon carbide (SiC) transistors, which may have a bandgap of 2.36 to 3.24 eV, with different polytypes of SiC having different bandgaps. In another example, each of the solid-state switches in the inverter bridge 28 may be Gallium nitride (GaN) transistors, which may have a bandgap of about 3.4 eV.

In some embodiments, the V-I converter 24 may be configured to boost a first DC voltage from the DC link bus to a second DC voltage upon the battery bus 22 in the charging mode, with the second DC voltage greater than the first DC voltage. More specifically, the inverter bridge 28 and the V-I converter 24 may operate in conjunction with one-another to boost the voltage on the DC link bus 26 to a higher voltage on the battery bus 22. In some embodiments, the second DC voltage may be at least two-times the first DC voltage. For example, the DC link bus 26 may have a first voltage of 400 VDC, which may be boosted to a second voltage of 800 VDC upon the battery bus 22, which may be determined to match the operating requirements of the battery 20.

In some embodiments, and shown in the example schematic diagrams of FIGS. 4-7, the V-I converter 24 includes a quasi-Z-Source (qZS).

Referring to FIGS. 4-7, schematic diagrams of different example configurations of a motor drive system 10 are shown. More specifically, the motor drive systems 10 shown in FIGS. 4-7 each include a V-I converter 24 with a quasi-Z-Source (qZS) that includes a DC Bus inductor 50 defining a first lead and a second lead, with the first lead connected to the positive source node 22a of the battery bus 22. The motor drive systems 10 shown in FIGS. 4-7 each also include a first winding 52 defining a first lead and a second lead, a second winding 54 defining a first lead and a second lead, a first capacitor 56 defining a first terminal and a second terminal. The motor drive systems 10 shown in FIGS. 4-7 each also include a rectifier 58 defining an input terminal and an output terminal and configured to pass current from the input terminal to the output terminal while blocking current from passing in an opposite direction.

In some embodiments, and as shown in FIGS. 4-7, the motor drive system 10 may include an output choke 60 including capacitors connected between each of the motor leads 30 and a common node, which may be connected to an earth ground. The output choke 60 may function to reduce electromagnetic interference (EMI) from being transmitted to the motor leads 30 from the inverter bridge 28. The output choke 60 may also control oscillating torque and V and I waveform symmetry and shape in the electric motor 32 during charging.

Referring now to the example motor drive system 10 of FIG. 4, each of the first winding 52 and the second winding 54 are inductors. The reference source node 22b of the battery bus 22 is connected to the low-side conductor 26b of the DC link bus 26. The second lead of the DC bus inductor 50 is connected to the high-side conductor 26a of the DC link bus 26 and to the first lead of the first winding 52. The second lead of the first winding 52 defines a first internal node 64. The first terminal of the first capacitor 56 is connected to the first internal node 64, and the second terminal of the first capacitor 56 is connected to the low-side conductor 26b of the DC link bus 26. The output terminal of the rectifier 58 connected to the first internal node 64, and the input terminal of the rectifier 58 defines a second internal node 66. The example V-I converter 24 of FIG. 4 also includes a second capacitor 62 defining a first terminal and a second terminal, with the first terminal of the second capacitor 62 connected to the high-side conductor 26a of the DC link bus 26, and the second terminal of the second capacitor 62 connected to the second internal node 66. The first lead of the second winding 54 is connected to the second internal node 66, and the second lead of the second winding 54 is connected to the low-side conductor 26b of the DC link bus 26.

Figure 5:
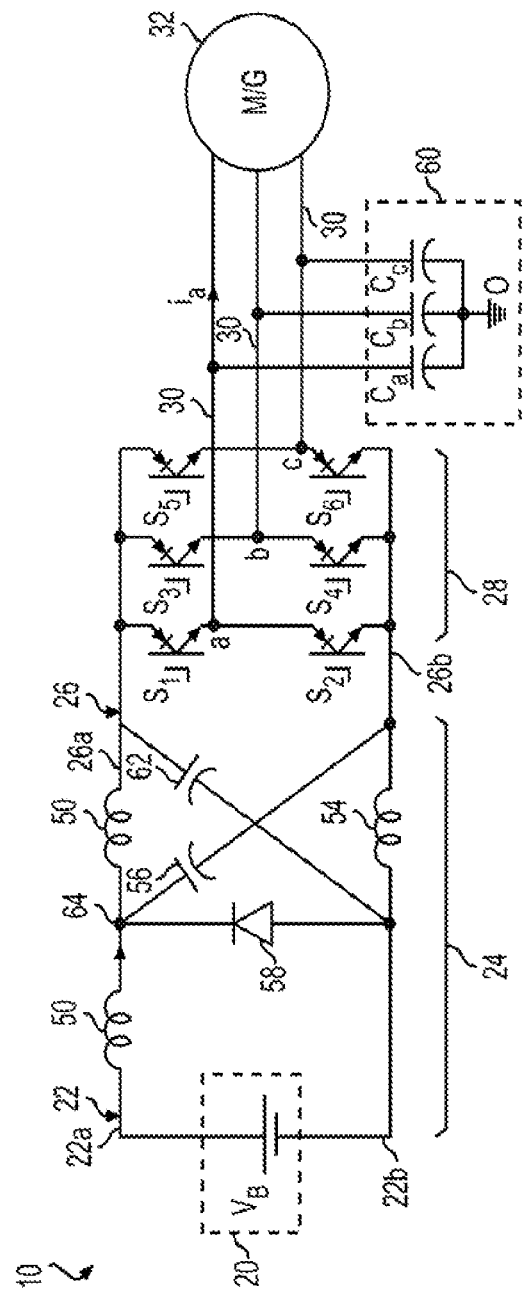
FIG. 5 is a schematic diagram of a motor drive in accordance with some embodiments of the present disclosure.

Referring now to the example motor drive system 10 of FIG. 5, each of the first winding 52 and the second winding 54 are inductors. The second lead of the DC bus inductor 50 defines a first internal node 64. The first lead of the first winding 52 is connected to the first internal node 64, and the second lead of the first winding 52 is connected to the high-side conductor 26a of the DC link bus 26. The first terminal of the first capacitor 56 is connected to the first internal node 64, and the second terminal of the first capacitor 56 is connected to the low-side conductor 26b of the DC link bus 26. The output terminal of the rectifier 58 is connected to the first internal node 64, and the input terminal of the rectifier 58 is connected to the reference source node 22b of the battery bus 22. The example V-I converter 24 of FIG. 5 also includes a second capacitor 62 defining a first terminal and a second terminal, with the first terminal of the second capacitor 62 connected to the high-side conductor 26a of the DC link bus 26, and the second terminal of the second capacitor 62 connected to the reference source node 22b of the battery bus 22. The first lead of the second winding 54 is connected to the reference source node 22b of the battery bus 22, and the second lead of the second winding 54 is connected to the low-side conductor 26b of the DC link bus 26.

Figure 6:
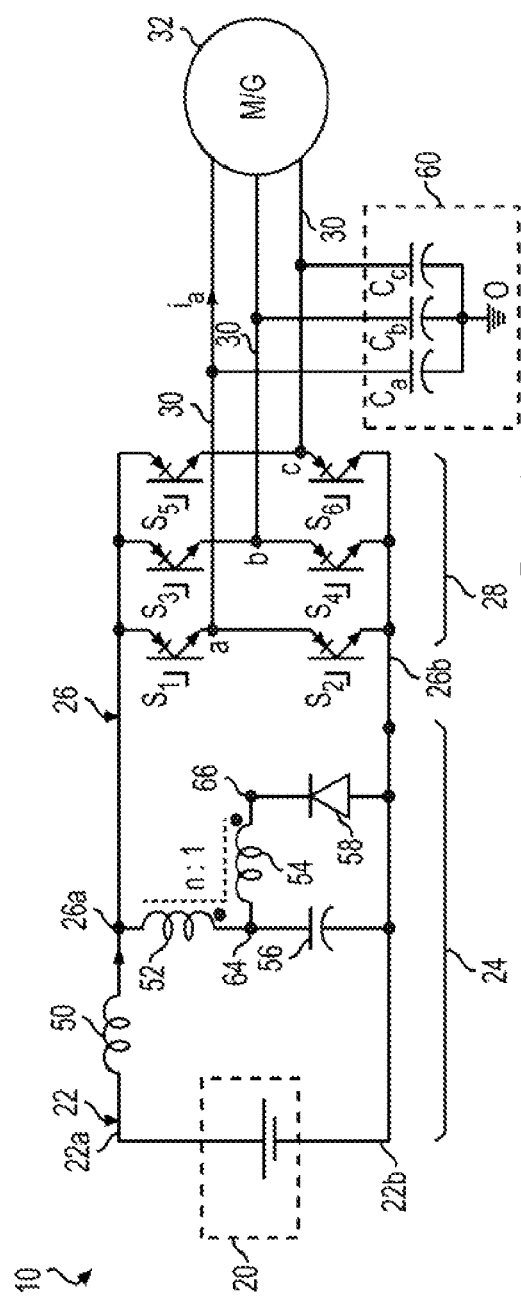
FIG. 6 is a schematic diagram of a motor drive in accordance with some embodiments of the present disclosure.

Referring now to the example motor drive system 10 of FIG. 6, the first winding 52 and the second winding 54 are magnetically coupled as a transformer having a n:1 turns ratio, where n is an integer number. The reference source node 22b of the battery bus 22 is directly connected to a low-side conductor 26b of the DC link bus 26. The second lead of the DC bus inductor 50 is connected to the high-side conductor 26a of the DC link bus 26 and to the first lead of the first winding 52. The second lead of the first winding 52 defines a first internal node 64. The first terminal of the first capacitor 56 is connected to the first internal node 64, and the second terminal of the first capacitor 56 is connected to the low-side conductor 26b of the DC link bus 26. The first lead of the second winding 54 is connected to the first internal node 64, and the second lead of the second winding 54 defines a second internal node 66. The output terminal of the rectifier 58 is connected to the second internal node 66, and the input terminal of the rectifier 58 is connected to the low-side conductor 26b of the DC link bus 26.

Figure 7:
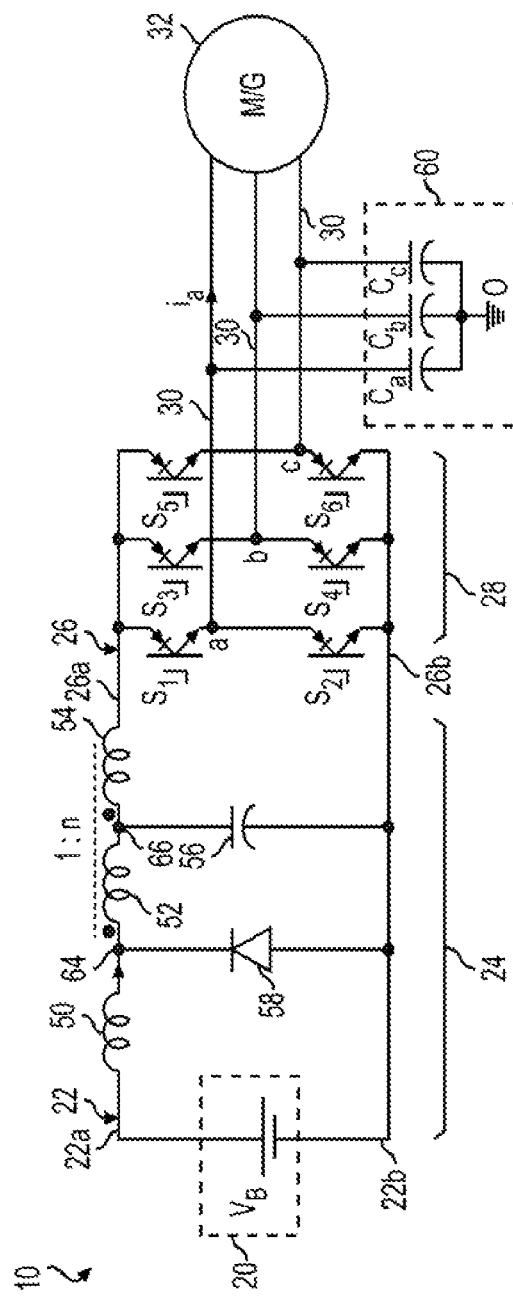
FIG. 7 is a schematic diagram of a motor drive in accordance with some embodiments of the present disclosure.

Referring now to the example motor drive system 10 of FIG. 7, the first winding 52 and the second winding 54 are magnetically coupled as a transformer having a 1:n turns ratio, where n is an integer number. The reference source node 22b of the battery bus 22 is directly connected to the low-side conductor 26b of the DC link bus 26. The second lead of the DC bus inductor 50 defines a first internal node 64. The first lead of the first winding 52 is connected to the first internal node 64, and the second lead of the first winding 52 defines a second internal node 66. The first lead of the second winding 54 is connected to the second internal node 66, and the second lead of the second winding 54 is connected to the high-side conductor 26a of the DC link bus 26. The output terminal of the rectifier 58 is connected to the first internal node 64, and the input terminal of the rectifier 58 is connected to the low-side conductor 26b of the DC link bus 26. The first terminal of the first capacitor 56 is connected to the second internal node 66, and the second terminal of the first capacitor 56 is connected to the low-side conductor 26b of the DC link bus 26.

In some embodiments, and as shown in the examples of FIGS. 4-7, the rectifier 58 may include a diode. More specifically, the rectifier 58 may take the form of a single diode having an anode and a cathode, where the input terminal of the rectifier 58 is the anode the output terminal is the cathode. In some embodiments, the V/I converter 24 may include a single-diode rectifier 58, such as in the example configurations shown in FIGS. 4-7 while also providing for bi-directional power flow, allowing such V/I converters 24 to be used, for example, in any of the configurations shown in FIGS. 1-3. In some other embodiments (not shown in the FIGS.) the rectifier 58 may include a switch configured to perform active rectification by passing current in one direction and blocking current flow in a reverse direction. The rectifier 58 may include, for example, a bidirectionally conducting, unidirectionally blocking switch. In some embodiments, a bidirectionally conducting, unidirectionally blocking switch may operate in one or more different modes to enable power flow through the V/I converter 24 in either of two opposite directions.

Figure 8:
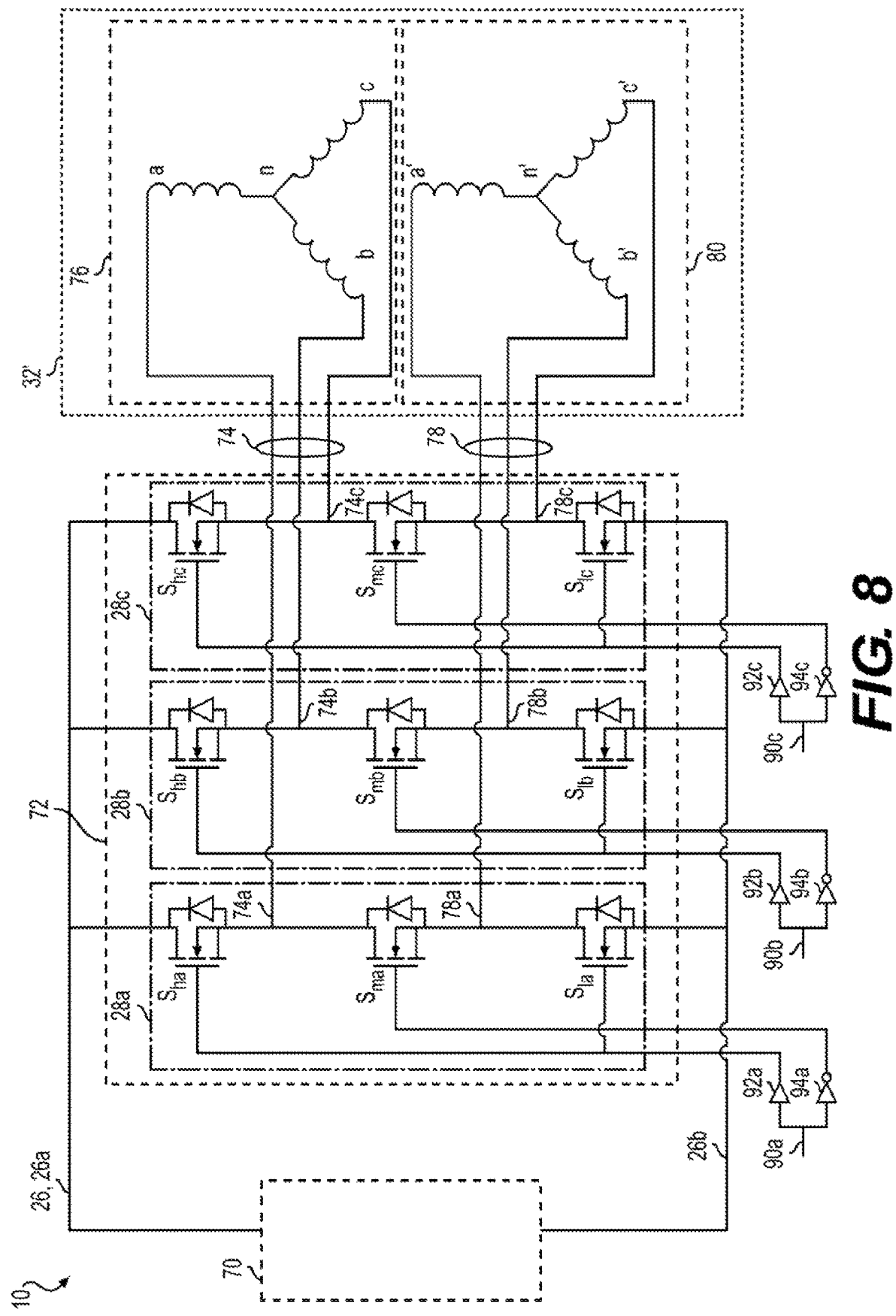
FIG. 8 is a schematic diagram of a motor drive including a nine-switch inverter in accordance with some embodiments of the present disclosure.

Referring now to FIG. 8, a motor drive 10 for providing AC power to an electric motor 32' is shown schematically. The motor drive 10 includes a DC link bus 26 including a high-side conductor 26a and a low-side conductor 26b configured to be energized by a first DC electrical power having a substantially constant voltage from a direct current (DC) voltage source 70. The DC voltage source 70 may include, for example, a battery or an output stage of a rectifier. The motor drive 10 also includes a nine-switch inverter (NSI) 72 coupled to the DC link bus 26 and including nine solid-state switches configured to generate 3-phase AC power upon a first set of motor leads 74 to supply a first winding set 76 within the electric motor 32', the nine solid-state switches in the NSI 72 are also configured to generate 3-phase AC power upon a second set of motor leads 78 to supply a second winding set 80 within the electric motor 32'. In some embodiments, and as shown in FIG. 8, each winding set 76, 80 includes three motor windings a, b, c, and a', b', c', respectively, with each winding set 76, 80 having a wye configuration to define a center neutral node n, n'. One or both winding sets 76, 80 may have a different configuration, and one or both of the winding sets 76, 80 may have a different number of motor windings, which may be greater than or fewer than three.

As shown in FIG. 8, the nine-switch inverter 72 includes: an a-phase high switch $S_{ha}$ configured to selectively conduct current between the high-side conductor 26a and a first motor lead 74a of the first set of motor leads 74; a b-phase high switch $S_{hb}$ configured to selectively conduct current between the high-side conductor 26a and a second motor lead 74b of the first set of motor leads 74; and a c-phase high switch $S_{hc}$ configured to selectively conduct current between the high-side conductor 26a and a third motor lead 74c of the first set of motor leads 74. The nine-switch inverter 72 also includes: an a-phase low switch $S_{la}$ configured to selectively conduct current between the low-side conductor 26b and a first motor lead 78a of the second set of motor leads 78; a b-phase low switch $S_{lb}$ configured to selectively conduct current between the low-side conductor 26b and a second motor lead 78b of the second set of motor leads 78; and a c-phase low switch $S_{lc}$ configured to selectively conduct current between the low-side conductor 26b and a third motor lead 78c of the second set of motor leads 78. The nine-switch inverter 72 also includes: an a-phase middle switch $S_{ma}$ configured to selectively conduct current between the first motor lead 74a of the first set of motor leads 74 and the first motor lead 78a of the second set of motor leads 78; a b-phase middle switch $S_{mb}$ configured to selectively conduct current between the second motor lead 74b of the first set of motor leads 74 and the second motor lead 78b of the second set of motor leads 78; and a c-phase middle switch $S_{mc}$, configured to selectively conduct current between the third motor lead 74c of the first set of motor leads 74 and the third motor lead 78c of the second set of motor leads 78.

Each of the solid-state switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ shown in FIG. 8 are shown as Metal-Oxide Semiconductor Field Effect Transistors (MOSFETs), however, the MOSFETs are representative of any device that may be used as an electrically controlled switch (e.g., junction transistors, Gallium nitride (GaN) High-electron-mobility transistors (HEMTs), silicon carbide (SiC) devices, FETs of other types, and/or silicon controlled rectifiers).

In some embodiments, the nine-switch inverter 72 is configured to be operated in a rectifier mode to convert 3-phase AC electrical current from each of the first and second sets of motor leads 74, 78 to supply DC power from the electric motor 32', to the DC voltage source 70 via the DC link bus 26. For example, the DC voltage source 70 may include a battery, which may be charged via regenerative braking by the electric motor 32', using the using the nine-switch inverter 72. In another example, an external AC source may be connected to one or both of the first and second sets of motor leads 74, 78, which may be rectified by the nine-switch inverter 72 to charge a battery within the DC voltage source 70.

In some embodiments, each of the solid-state switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ in the nine-switch inverter 72 are wide-bandgap (WBG) devices having a bandgap greater than 2.0 electron-volts (eV). For example, in some embodiments, each of the solid-state switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ in the nine-switch inverter 72 may be Silicon carbide (SiC) transistors. In other embodiments, each of the solid-state switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ in the nine-switch inverter 72 may be Gallium nitride (GaN) transistors.

In some embodiments, the nine-switch inverter 72 may be configured to supply the 3-phase AC power upon the second set of motor leads 78 having a phase difference of 180 degrees from the 3-phase AC power upon the first set of motor leads 74. This phase difference of 180 degrees in the AC power may be used, for example, where the winding sets 76, 80 of the electric motor 32' are rotationally aligned with one another. For example, in an electric motor 32' with second windings a', b', c' of the second winding set 80 that are paired with the corresponding first winding a, b, c of the first winding set 76, such that windings a, and a' share one or more common slots in a stator of the electric motor 32', and windings b, and b' also share one or more common slots and windings c, and c' also share one or more common slots. In some embodiments, the second windings a', b', c' of the second winding set 80 may be rotationally offset from corresponding first windings a, b, c of the first winding set 76. For example, the second a-phase winding a' may be rotationally offset from the first a-phase winding a by 30 degrees, 60 degrees, 90 degrees, or 180 degrees. The electric motor 32' could be any type of electric machine, such as a permanent magnet motor or a non-permanent motor such as wound field machine, induction machine, synchronous reluctance machine, switched reluctance machine, etc.

In some embodiments, the nine-switch inverter 72 may be configured to supply the 3-phase AC power upon the second set of motor leads 78 having an opposite polarity as the first set of motor leads 74. In other words, each of the first windings a, b, c of the first winding set 76 may be configured in an opposite direction as the corresponding second windings a', b', c' of the second winding set 80. For example, the nine-switch inverter 72 may drive a maximum current in a first a-phase winding a into the corresponding center neutral node n, while simultaneously driving a maximum current in the second a-phase winding a' out from its corresponding center neutral node n'. For those currents in opposite directions to generate an additive magnetic flux, the associated first and second windings a, a' should extend in opposite directions. For example, the first and second windings a, a' may be wound in opposite directions through a shared set of stator slots in the electric motor 32'. This type of motor winding can be used for oscillating torque cancellation and V and I waveform symmetry in the electric motor 32' during charging.

In some embodiments of the nine-switch inverter 72, and as shown in FIG. 8, the a-phase solid-state switches $S_{ha}$, $S_{ma}$, $S_{la}$, shares a common a-phase gate control signal 90a. More specifically, the a-phase gate control signal 90a is connected through an a-phase non-inverting buffer 92a to control both the a-phase high switch $S_{ha}$ and the a-phase low switch $S_{la}$, and the a-phase gate control signal 90a is connected through an a-phase inverting buffer 94a to control the a-phase middle switch $S_{ma}$. Similarly, the b-phase solid-state switches $S_{hb}$, $S_{mb}$, $S_{lb}$, share a common b-phase gate control signal 90b, which is connected through a b-phase non-inverting buffer 92b to control both the b-phase high switch $S_{hb}$ and the b-phase low switch $S_{lb}$. The b-phase gate control signal 90b is also connected through a b-phase inverting buffer 94b to control the b-phase middle switch $S_{mb}$. Similarly, the c-phase solid-state switches $S_{hc}$, $S_{mc}$, $S_{lc}$, share a common c-phase gate control signal 90c, which is connected through a c-phase non-inverting buffer 92c to control both the c-phase high switch $S_{hc}$ and the b-phase low switch $S_{lc}$. The c-phase gate control signal 90c is also connected through a c-phase inverting buffer 94c to control the b-phase middle switch $S_{mc}$. The nine-switch inverter 72 may, therefore operate each the each of the solid-state switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ using three gate control signals 90a, 90b, 90c, providing eight different output states.

Motor drives that incorporate features of the present disclosure may provide several advantages over conventional designs. For example, a motor drive constructed in accordance with the present disclosure may have reduced or nullified common-mode noise and reduced switching losses, which improves the inverter performance by 1.5%-2% over conventional 2-level IGBT based inverters in electric vehicles (EVs). Another advantage of the present disclosure is that it may enable designs with reduced size electromagnetic interference (EMI) filters, which can further reduce the size and weight of the motor drive. Another advantage of the present disclosure is that it can provide lower costs when compared with conventional inverters, by utilizing low cost switching transistors, such as Si-MOSFET TO-247 package components. Additional cost savings may be realized due to the smaller EMI filters. Another advantage of the present disclosure is that inverter switching losses can be reduced by utilizing a near-state space vector pulse width modulation (PWM) control technique, which may also be called a near-state pulse-width modulation (NSPWM) control. The present disclosure may also reduce bearing current within an electric motor.

Figure 9:
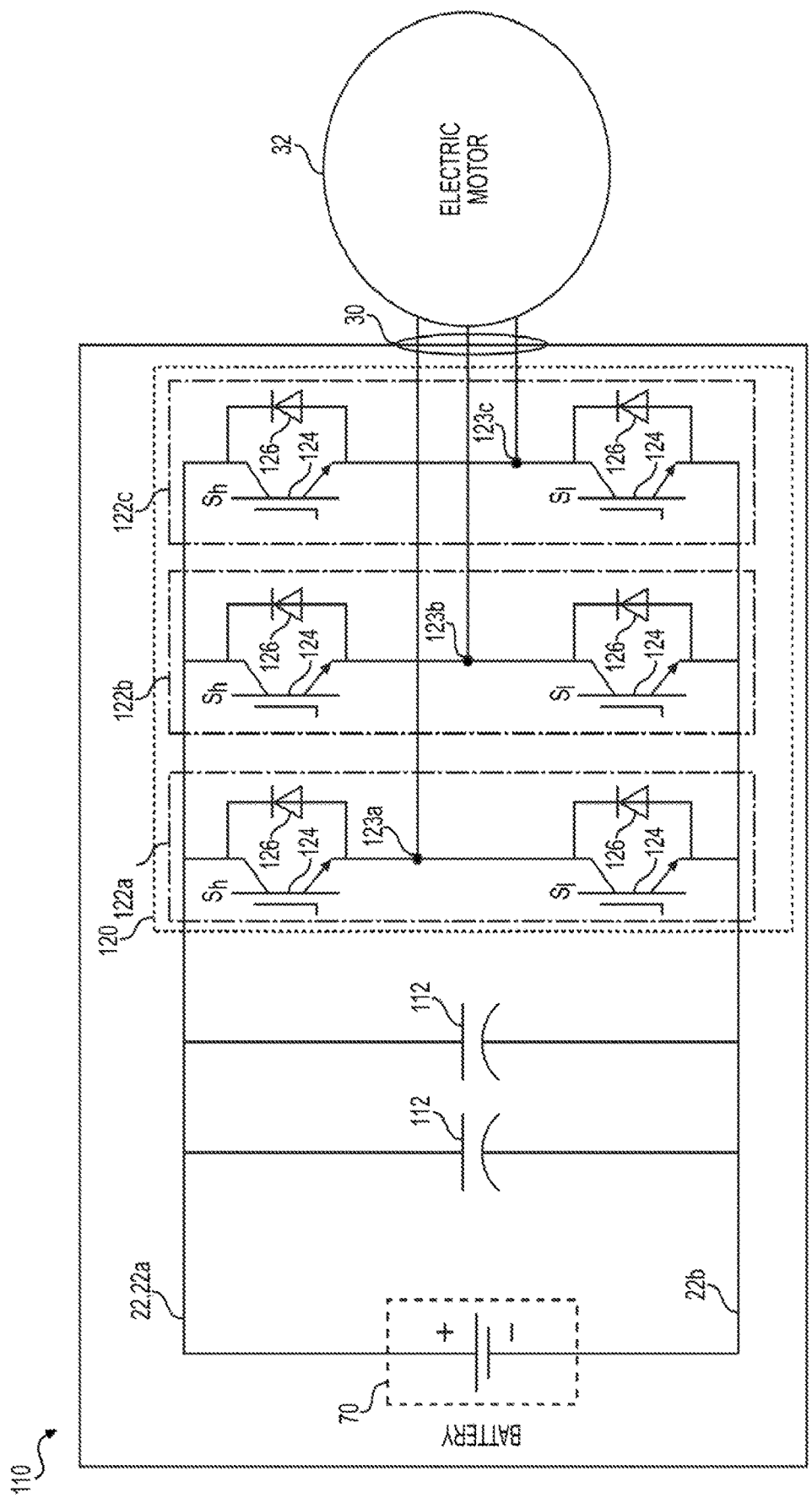
FIG. 9 is a schematic diagram of a motor drive including a two-level inverter.

A schematic diagram of a first motor drive 110, having a conventional design, is shown in FIG. 9. More specifically, the first motor drive 110 includes a direct current (DC) voltage source 70 in the form of a battery to supply a DC electrical power upon a DC link bus 22 including a high-side conductor 22a and a low-side conductor 22b, with the high-side conductor 22a having a higher voltage potential than the low-side conductor 22b. A set of two smoothing capacitors 112 are connected across the DC link bus 22 between the high-side conductor 22a and the low-side conductor 22b to maintain the DC voltage thereacross. There may be more or fewer smoothing capacitors 24, and the size and/or rating of the smoothing capacitors 24 may be chosen according to a particular application. The DC voltage source 70 may include other sources of DC power, such as an output stage of a rectifier instead of or in addition to the battery. The first motor drive 110 also includes a first inverter 120 having three phase drivers 122a, 122b, 122c, with each of the phase drivers 122a, 122b, 122c configured to switch current from the DC link bus 22 to supply AC power upon a corresponding output terminal 123a, 123b, 123c. The output terminals 123a, 123b, 123c are connected to corresponding ones of three motor leads 30, which deliver the AC power as three-phase AC power to an electric motor 32. The example first motor drive 110 shown in FIG. 9 includes three phase drivers 122a, 122b, 122c, however, motor drives 10 may be provided with a different number of phase drivers 122a, 122b, 122c. For example, a single-phase motor drive may have only one of the phase drivers 122a, 122b, 122c, or a six-phase motor drive may have six of the phase drivers 122a, 122b, 122c.

Each of the phase drivers 122a, 122b, 122c within the first inverter 120 of the first motor drive 110 includes a high-side switch $S_h$ configured to selectively conduct current between a corresponding one of the output terminals 123a, 123b, 123c and the high-side conductor 22a of the DC link bus 22. Each of the phase drivers 122a, 122b, 122c also includes a low-side switch $S_l$ configured to selectively conduct current between a corresponding one of the output terminals 123a, 123b, 123c and the low-side conductor 22b of the DC link bus 22.

Still referring to FIG. 9, each of the switches $S_h$, $S_l$ includes a switching transistor 124 and a body diode 126. The switching transistors 124 may be, insulated gate bipolar transistors (IGBTs) or metal-oxide-semiconductor field-effect transistors (MOSFETs). Other types of devices may be used in the switches $S_h$, $S_l$ such as junction transistors, field effect transistors (FETs), or silicon-controlled rectifiers (SCRs). Each of the switches $S_h$, $S_l$ has a voltage rating, which must be sufficiently high enough to withstand the voltage condition to which the switches $S_h$, $S_l$ are subjected.

Figure 10:
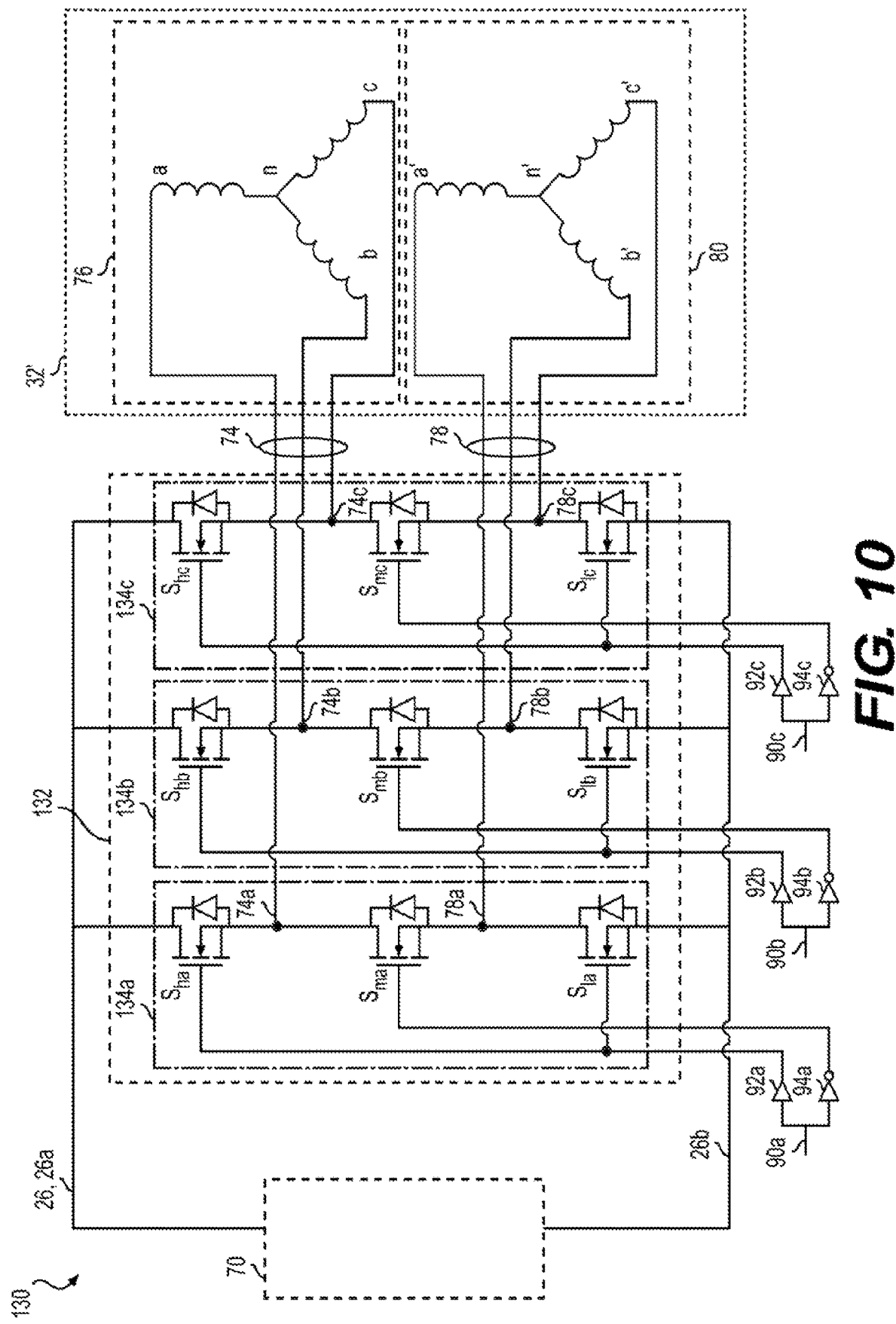
FIG. 10 is a schematic diagram of a motor drive including a nine-switch inverter in accordance with some embodiments of the present disclosure.

Referring now to FIG. 10, a second motor drive 130 for providing AC power to an electric motor 32' is shown with a passive load. The second motor drive 130 includes a DC link bus 22 including a high-side conductor 22a and a low-side conductor 22b configured to be energized by a first DC electrical power having a substantially constant voltage from a direct current (DC) voltage source 70. The DC voltage source 70 may include, for example, a battery or an output stage of a rectifier. The second motor drive 130 also includes a second inverter 132, taking the form of a nine-switch inverter (NSI), coupled to the DC link bus 22 and including nine switches configured to generate 3-phase AC power upon a first set of output terminals 74 to supply a first winding set 76 (not shown in FIG. 9) within the electric motor 32'. The nine switches in the second inverter 132 are also configured to generate 3-phase AC power upon a second set of output terminals 78 to supply a second winding set 80 (not shown in FIG. 9) within the electric motor 32'. A nine-switch inverter may reduce or eliminate common mode noise by separating the phase voltages and simultaneously shifting output currents 180 degrees apart from each other using a phase shifted PWM command.

In some embodiments, the electric motor 32' may be similar or identical to the electric motor 32' described above with reference to FIG. 8. For example, and as shown in FIG. 8, each winding set 76, 80 includes three motor windings a, b, c, and a', b', c', respectively, with each winding set 76, 80 having a wye configuration to define a center neutral node n, n'. One or both of the winding sets 76, 80 may have a different configuration, and one or both of the winding sets 76, 80 may have a different number of motor windings, which may be greater than or fewer than three.

As shown in FIG. 10, the second inverter 132 includes a phase driver 134a, 134b, 134c associated with each of the three output phases. Each of the phase drivers 134a, 134b, 134c is configured to switch current from the DC source 70 to generate the AC power upon one or more output terminals 74, 78. For example, the second inverter 132 shown in FIG. 10 includes an a-phase driver 134a that is configured to generate AC power upon a first output terminal 74a of the first set of output terminals 74 and upon a first output terminal 78a of the second set of output terminals 78. Specifically, the second inverter 132 shown in FIG. 10 generates AC power upon each of the first output terminals 74a, 78a that is 180-degrees out of phase from one another.

The a-phase driver 134a of the second inverter 132 includes: an a-phase high switch $S_{ha}$ configured to selectively conduct current between the high-side conductor 22a and a first output terminal 74a of the first set of output terminals 74; an a-phase low switch $S_{la}$ configured to selectively conduct current between the low-side conductor 22b and a first output terminal 78a of the second set of output terminals 78; and an a-phase middle switch $S_{ma}$ configured to selectively conduct current between the first output terminal 74a of the first set of output terminals 74 and the first output terminal 78a of the second set of output terminals 78. Similarly, the b-phase driver 134b of the second inverter 132 includes: a b-phase high switch $S_{hb}$ configured to selectively conduct current between the high-side conductor 22a and a second output terminal 74b of the first set of output terminals 74; a b-phase low switch $S_{lb}$ configured to selectively conduct current between the low-side conductor 22b and a second output terminal 78b of the second set of output terminals 78; and a b-phase middle switch $S_{mb}$ configured to selectively conduct current between the second output terminal 74b of the first set of output terminals 74 and the second output terminal 78b of the second set of output terminals 78. Also similarly, the c-phase driver 134c of the second inverter 132 includes: a c-phase high switch $S_{hc}$ configured to selectively conduct current between the high-side conductor 22a and a third output terminal 74c of the first set of output terminals 74; a c-phase low switch $S_{lc}$ configured to selectively conduct current between the low-side conductor 22b and a third output terminal 78c of the second set of output terminals 78; and a c-phase middle switch $S_{mc}$, configured to selectively conduct current between the third output terminal 74c of the first set of output terminals 74 and the third output terminal 78c of the second set of output terminals 78.

Each of the switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ shown in FIG. 10 are Metal-Oxide Semiconductor Field Effect Transistors (MOSFETs), however, the MOSFETs are representative of any device that may be used as an electrically controlled switch (e.g., junction transistors, Gallium nitride (GaN) High-electron-mobility transistors (HEMTs), silicon carbide (SiC) devices, FETs of other types, and/or silicon controlled rectifiers).

In some embodiments, the second inverter 132 may be configured to be operated in a rectifier mode to convert 3-phase AC electrical current from each of the first and second sets of output terminals 74, 78 to supply DC power from the electric motor 32', to the DC voltage source 70 via the DC link bus 22. For example, the DC voltage source 70 may include a battery, which may be charged via regenerative braking by the electric motor 32', using the using the second inverter 132. In another example, an external AC source may be connected to one or both of the first and second sets of output terminals 74, 78, which may be rectified by the second inverter 132 to charge a battery within the DC voltage source 70.

In some embodiments, the second inverter 132 supplies the 3-phase AC power upon the second set of output terminals 78 having a phase difference of 180 degrees from the 3-phase AC power upon the first set of output terminals 74. This phase difference of 180 degrees in the AC power may be used, for example, where the winding sets 76, 80 of the electric motor 32' are rotationally aligned with one another. For example, in an electric motor 32' with second windings a', b', c' of the second winding set 80 that are paired with the corresponding first winding a, b, c of the first winding set 76, such that windings a, and a' share one or more common slots in a stator of the electric motor 32', and windings b, and b' also share one or more common slots and windings c, and c' also share one or more common slots. In some embodiments, the second windings a', b', c' of the second winding set 80 may be rotationally offset from corresponding first windings a, b, c of the first winding set 76. For example, the second a-phase winding a' may be rotationally offset from the first a-phase winding a by 30 degrees, 60 degrees, 90 degrees, or 180 degrees.

In some embodiments, the second inverter 132 may be configured to supply the 3-phase AC power upon the second set of output terminals 78 having an opposite polarity as the first set of output terminals 74. In other words, each of the first windings a, b, c of the first winding set 76 may be configured in an opposite direction as the corresponding second windings a', b', c' of the second winding set 80. For example, the second inverter 132 may drive a maximum current in a first a-phase winding a into the corresponding center neutral node n, while simultaneously driving a maximum current in the second a-phase winding a' out from its corresponding center neutral node n'. In order for those currents in opposite directions to generate an additive magnetic flux, the associated first and second windings a, a' should extend in opposite directions. For example, the first and second windings a, a' may be wound in opposite directions through a shared set of stator slots in the electric motor 32'.

In some embodiments of the second inverter 132, and as shown in FIG. 10, the a-phase switches $S_{ha}$, $S_{ma}$, $S_{la}$ share a common a-phase gate control signal 90a. More specifically, the a-phase gate control signal 90a is connected through an a-phase non-inverting buffer 92a to control both of the a-phase high switch $S_{ha}$ and the a-phase low switch $S_{la}$, and the a-phase gate control signal 90a is connected through an a-phase inverting buffer 94a to control the a-phase middle switch $S_{ma}$. Similarly, the b-phase switches $S_{hb}$, $S_{mb}$, $S_{lb}$, share a common b-phase gate control signal 90b, which is connected through a b-phase non-inverting buffer 92b to control both of the b-phase high switch $S_{hb}$ and the b-phase low switch $S_{lb}$. The b-phase gate control signal 90b is also connected through a b-phase inverting buffer 94b to control the b-phase middle switch $S_{mb}$. Similarly, the c-phase switches $S_{hc}$, $S_{mc}$, $S_{lc}$, share a common c-phase gate control signal 90c, which is connected through a c-phase non-inverting buffer 92c to control both of the c-phase high switch $S_{hc}$ and the b-phase low switch $S_{lc}$. The c-phase gate control signal 90c is also connected through a c-phase inverting buffer 94c to control the b-phase middle switch $S_{mc}$. The second inverter 132 may, therefore operate each the each of the switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ using three gate control signals 90a, 90b, 90c, providing eight different output states.

In some embodiments, and as shown in FIG. 10, each of the switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ in the second inverter 132 may be the same type of device. For example, in some embodiments, each of the switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ in the second inverter 132 may be silicon metal-oxide-semiconductor field-effect transistors (Si-MOSFETs) having a first voltage rating of less than 400 V.

In some inverters 120, 132, one or more of the switches $S_{ha}$, $S_{hb}$, $S_{hc}$, $S_{la}$, $S_{lc}$, $S_{lb}$, $S_{lc}$, $S_{ma}$, $S_{mb}$, $S_{mc}$ may be required switch current between conductors having a higher voltage difference than other ones of the switches $S_{ha}$, $S_{hb}$, $S_{hc}$, $S_{la}$, $S_{lc}$, $S_{lb}$, $S_{lc}$, $S_{lc}$, $S_{ma}$, $S_{mb}$, $S_{mc}$. For example, the middle switches $S_{ma}$, $S_{mb}$, $S_{mc}$ in the nine-switch inverter 26' are subjected to the full DC link voltage between the high-side conductor 22a and the low-side conductor 22b, and each of the high switches and the low switches $S_{ha}$, $S_{hb}$, $S_{hc}$, $S_{la}$, $S_{lc}$, $S_{lb}$, $S_{lc}$, are each subjected to one-half of the full DC link voltage between the high-side conductor 22a and the low-side conductor 22b. In some embodiments, the full DC link voltage may be 400V or 800V to correspond with a voltage output by a high-voltage DC battery pack.

Figure 11:
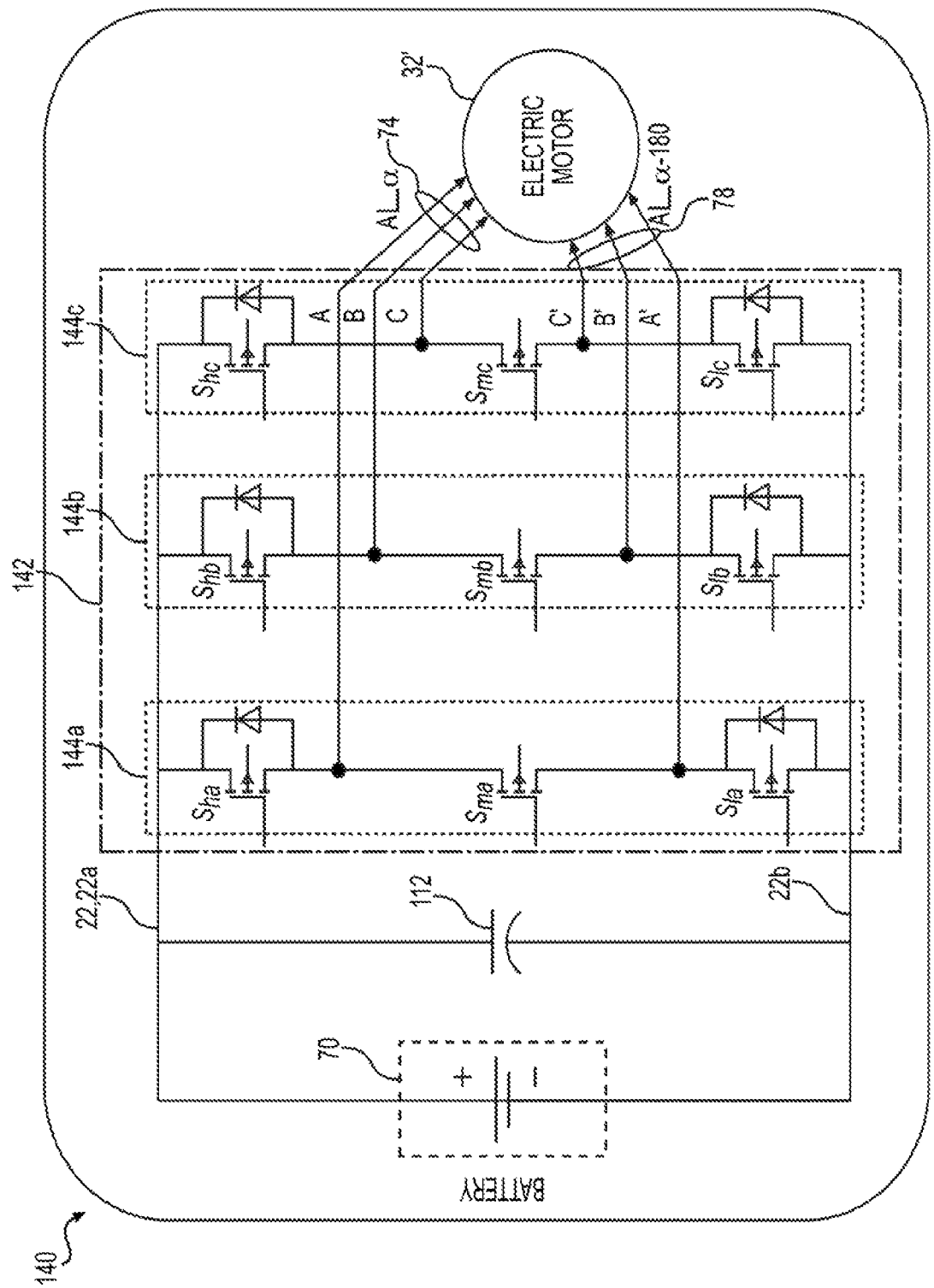
FIG. 11 is a schematic diagram of a motor drive including a nine-switch inverter in accordance with some embodiments of the present disclosure.

FIG. 11 is a schematic diagram of a third motor drive 140 according to an aspect of the disclosure. Specifically, the third motor drive 140 includes a third inverter 142, which may be similar in construction and operation to the second inverter 132 described above with reference to FIG. 10. The third inverter 142 includes a phase driver 144a, 144b, 144c, each configured to switch current from the DC source 70 to generate AC power upon corresponding ones of the output terminals 74, 78. Unlike the second inverter 132 described above with reference to FIG. 10, the phase drivers 144a, 144b, 144c within the third inverter 142 each include two or more different solid-state switches, each having a different voltage rating. The third inverter 142 may be called a "hybrid inverter" as a result of including the two or more different solid-state switches.

More specifically, in some embodiments, the high and low switches are first solid-state switches having a first voltage rating, and the middle switches second solid-state switches having a second voltage rating that is higher than the first voltage rating. In some embodiments, the first solid-state switches are Si-MOSFET devices, having a first voltage rating of 350 V, and the second solid-state switches are Gallium Nitride (GaN) wide bandgap (WBG) transistors from GaN system, having a second voltage rating of 650 V. Such a configuration may be used with a DC bus voltage of up to 650 VDC, such as, for example, a voltage source 70 providing a DC voltage of 400 VDC between the high-side conductor 22a and the low-side conductor 22b. In other words, the second solid-state switches having higher voltage ratings may be used only for the middle switches $S_{ma}$, $S_{mb}$, $S_{mc}$ where the higher voltage rating is needed to withstand the full DC link voltage between the high-side conductor 22a and the low-side conductor 22b, while less costly first solid-state switches, having a lower voltage rating, may be used for each of the high switches and the low switches $S_{ha}$, $S_{hb}$, $S_{hc}$, $S_{la}$, $S_{lc}$, $S_{lb}$, $S_{lc}$, as those switches are each subjected to one-half of the full DC link voltage between the high-side conductor 22a and the low-side conductor 22b.

However, the first solid-state switches, such as Si-MOSFETs may introduce additional switching losses compared to WBG devices, such as GaN transistors. A near-state pulse width modulation technique (NSPWM) may be used to offset the increase in switching losses due to use of Si-MOSFETs. The NSPWM control technique is described in more detail, below.

In some embodiments, the first solid-state switches are either insulated gate bipolar transistors (IGBTs), or metal-oxide-semiconductor field-effect transistors (MOSFETs). In other embodiments, the first solid-state switches may be silicon metal-oxide-semiconductor field-effect transistors (Si-MOSFETs), which may have a first voltage rating of less than 400 volts.

In some embodiments, the second solid-state switches may be a wide-bandgap (WBG) device having a bandgap greater than 2.0 electron-volts (eV). For example, the second solid-state switches may be Silicon carbide (SiC) transistors or Gallium nitride (GaN) transistors. In some embodiments, the second voltage rating of the second solid-state switches is greater than 400 volts.

Figure 12:
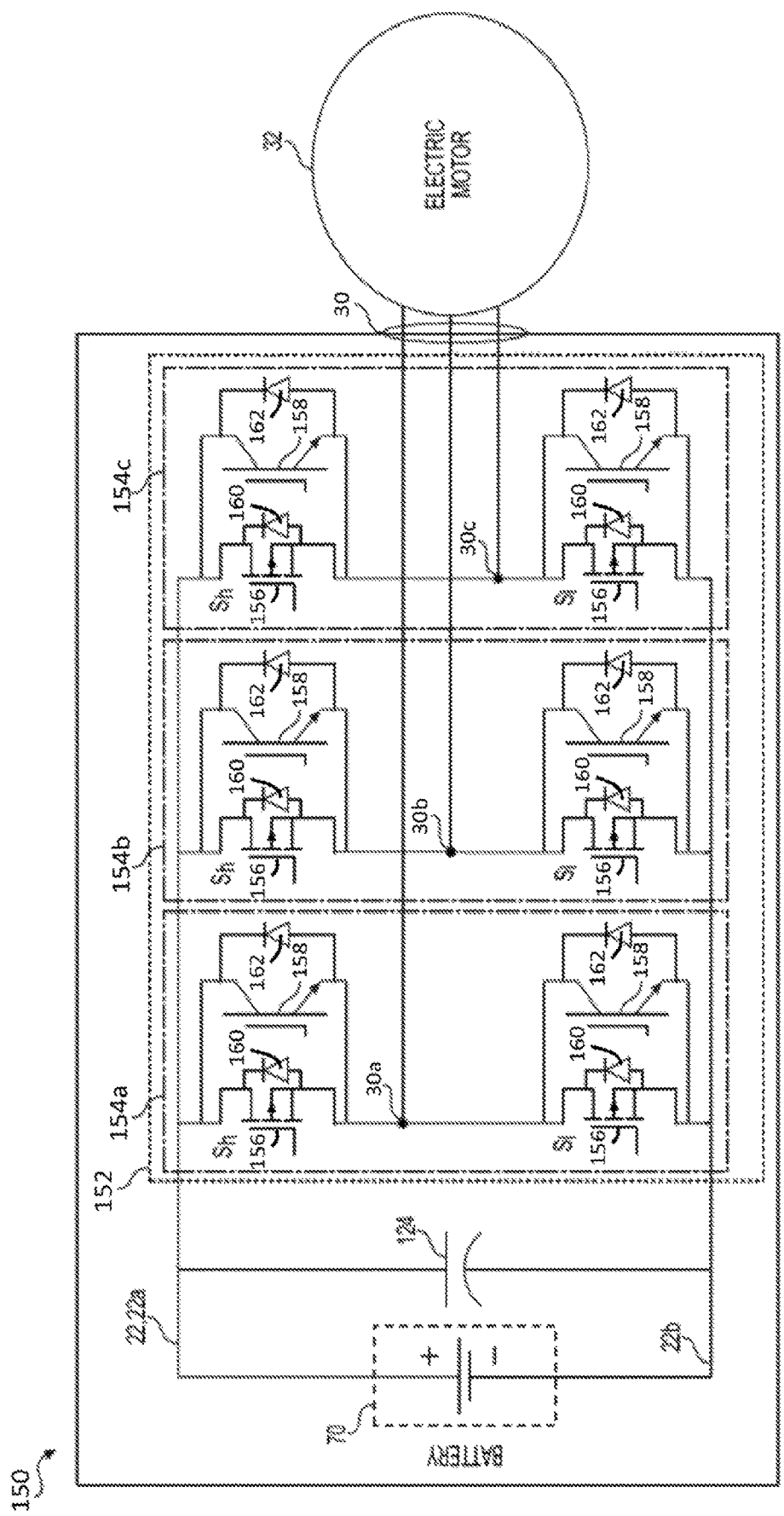
FIG. 12 is a schematic diagram of a motor drive in accordance with some embodiments of the present disclosure.

FIG. 12 is a schematic diagram of a fourth motor drive 150 according to an aspect of the disclosure. Specifically, the fourth motor drive 150 includes a fourth inverter 152, which may be similar in construction and operation to the first inverter 120 described above with reference to FIG. 9. The fourth inverter 152 includes a phase driver 154a, 154b, 154c, each configured to switch current from the DC source 70 to generate AC power upon corresponding ones of the output terminals 74, 78. Unlike the first inverter 120 described above with reference to FIG. 9, the phase drivers 154a, 154b, 154c within the fourth inverter 152 each include two or more different solid-state switches, each having a different voltage rating. Each of the phase drivers 154a, 154b, 154c includes a high-side switch $S_h$ and a low-side switch $S_l$, with each of the switches $S_h$, $S_l$ including two different solid-state switches 156, 158, each having a different voltage rating. Each of the two different solid-state switches 156, 158 is shown with a corresponding body diode 160, 162, but the presence of the body diodes 160, 162 may depend on the type of devices used for the two different solid-state switches 156, 158. In the illustrated example, each of the switches $S_h$, $S_l$ includes a first solid-state switch 156 connected in parallel with a second solid-state switch 158 such that current can flow between the DC source 22a, 22b and a corresponding one of the output terminals 30a, 30b, 30c with either of the first solid-state switch 156 or the second solid-state switch 158 in a conductive state. In practice, the first solid-state switch 156 and the second solid-state switch 158 are synchronized, thus splitting current approximately evenly therebetween.

The first solid-state switches 156 are Silicon carbide (SiC) transistors and the second solid-state switches 158 are insulated gate bipolar transistors (IGBT) in the example embodiment shown in FIG. 12. More specifically, the first solid-state switch 156 in an example embodiment is a SiC transistor having part number SCT3017AL from Rohm Semiconductor, and the second solid-state switch 158 is an IGBT having part number AUIRGPS4070D0 from Infineon. However, different types of solid-state switches may be used for either or both of the first solid-state switches 156 and/or the second solid-state switches 158. Also, the switches $S_h$, $S_l$ may have a different arrangement of the different solid-state switches 156, 158. For example, one or more of the high-side switches $S_h$ and/or the low-side switches $S_l$ may comprise two of the first solid-state switches 156 connected in series with one another, and one of the second solid-state switches 158 connected in parallel with the series combination of the first solid-state switches 156. Such a combination may be capable of switching loads having a higher voltage than a single one of the first solid-state switches 156. The fourth inverter 152 may be called a "hybrid inverter" as a result of including the two or more different solid-state switches. Such a hybrid inverter may provide a significant improvement in inverter efficiency. However, a hybrid inverter may present challenges in synchronizing operation of the different solid-state switches 156, 158 in a given one of the switches $S_h$, $S_l$.

Figure 13:
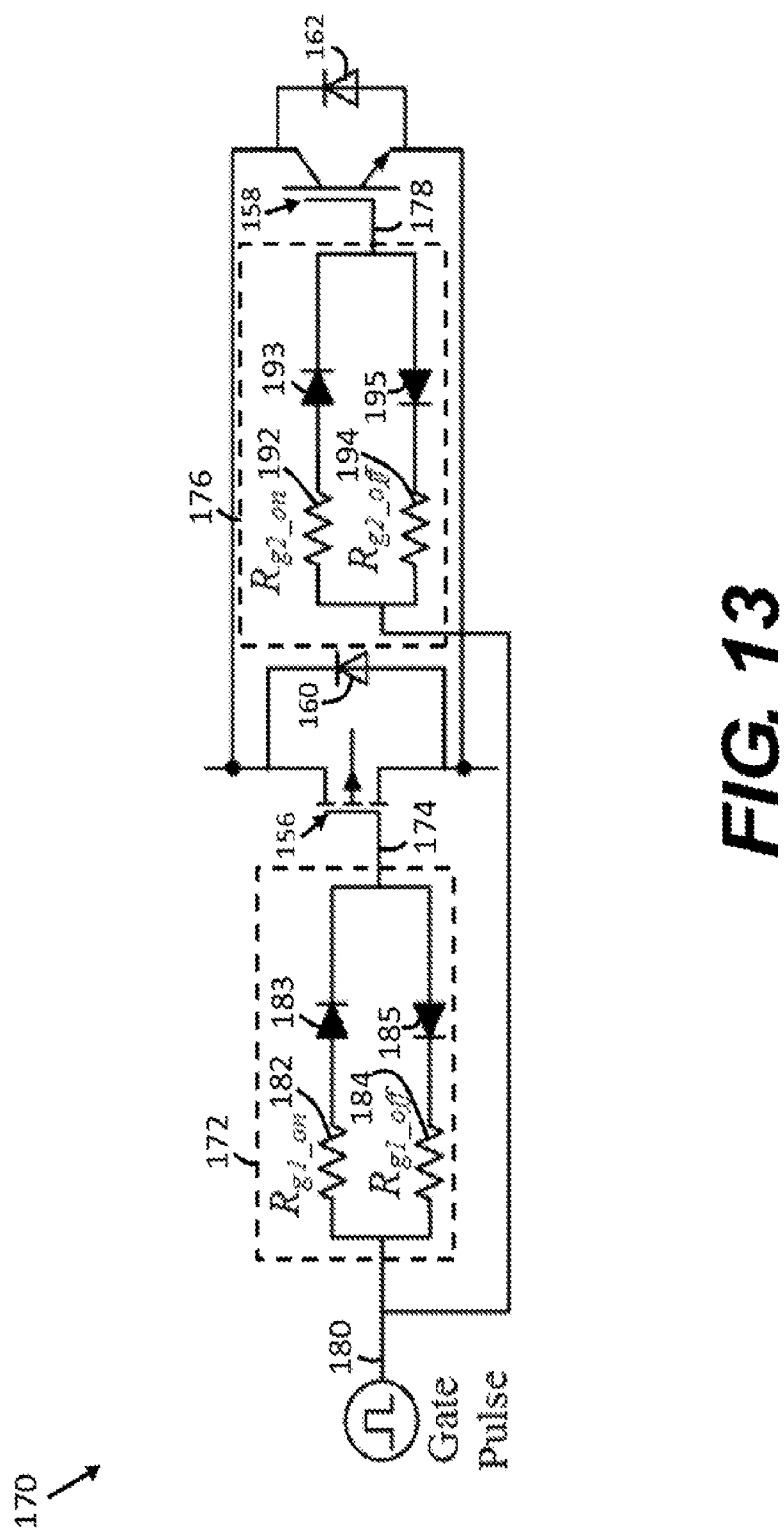
FIG. 13 is a schematic diagram of solid-state switches with gate driver circuits in accordance with some embodiments of the present disclosure.

FIG. 13 is a schematic diagram 170 of solid-state switches 156, 158 with gate driver circuits 172, 176 in accordance with some embodiments of the present disclosure. Each of the gate driver circuits 172, 176 functions as a delay driver to regulate flow of electrical current to and from a control terminal 174, 178 of a corresponding one of the solid-state switches 156, 158 in order to synchronize turn-on and turn-off of the solid-state switches 156, 158 based on a shared gate pulse control 180. The control terminals 174, 178 are gate terminals for Field-Effect Transistor (FET) or IGBT type solid-state switches 156, 158. However, the control terminal may be another structure for other types of solid-state switches 156, 158.

The first gate driver 172 is configured to energize a first control terminal 174 of the first solid-state switch 156 to cause the first solid-state switch 156 to change between a non-conductive state and a conductive state a first delay time after assertion of the gate pulse control 180. Specifically, the first gate driver 172 includes a first on-control resistor 182 having a resistance value $R_{g1\_on}$ connected in series with a first on-control diode 183. The series combination of the first on-control resistor 182 and the first on-control diode 183 are connected between the gate pulse control 180 and the first control terminal 174 of the first solid-state switch 156 with a cathode of the on-control diode 183 connected directly to the first control terminal 174 of the first solid-state switch 156. The resistance value $R_{g1\_on}$ of the first on-control resistor 182 controls the first delay time between assertion of the gate pulse control 180 and when the first solid-state switch 156 changes between the non-conductive state and the conductive state.

The first gate driver 172 is also configured to de-energize the first control terminal 174 of the first solid-state switch 156 to cause the first solid-state switch 156 to change between the conductive state and the non-conductive state a second delay time after de-assertion of the gate pulse control 180. Specifically, the first gate driver 172 includes a first off-control resistor 184 having a resistance value $R_{g1\_off}$ connected in series with a first off-control diode 185. The series combination of the first off-control resistor 184 and the first off-control diode 185 are connected between the gate pulse control 180 and the first control terminal 174 of the first solid-state switch 156 with an anode of the off-control diode 185 connected directly to the first control terminal 174 of the first solid-state switch 156. The resistance value $R_{g1\_off}$ of the first off-control resistor 184 controls the second delay time between de-assertion of the gate pulse control 180 and when the first solid-state switch 156 changes between the conductive state and the non-conductive state.

The second gate driver 176 is configured to energize a second control terminal 178 of the second solid-state switch 158 to cause the second solid-state switch 158 to change between a non-conductive state and a conductive state a third delay time after assertion of the gate pulse control 180. Specifically, the second gate driver 176 includes a second on-control resistor 182 having a resistance value $R_{g2\_on}$ connected in series with a second on-control diode 193. The series combination of the second on-control resistor 192 and the second on-control diode 193 are connected between the gate pulse control 180 and the second control terminal 178 of the second solid-state switch 158 with a cathode of the on-control diode 193 connected directly to the second control terminal 178 of the second solid-state switch 158. The resistance value $R_{g2\_on}$ of the second on-control resistor 192 controls the third delay time between assertion of the gate pulse control 180 and when the second solid-state switch 158 changes between the non-conductive state and the conductive state.

The second gate driver 176 is also configured to de-energize the second control terminal 178 of the second solid-state switch 158 to cause the second solid-state switch 156 to change between the conductive state and the non-conductive state a second delay time after de-assertion of the gate pulse control 180. Specifically, the second gate driver 176 includes a second off-control resistor 194 having a resistance value $R_{g2\_off}$ connected in series with a second off-control diode 195. The series combination of the second off-control resistor 194 and the second off-control diode 195 are connected between the gate pulse control 180 and the second control terminal 178 of the second solid-state switch 158 with an anode of the off-control diode 195 connected directly to the second control terminal 178 of the second solid-state switch 158. The resistance value $R_{g2\_off}$ of the second off-control resistor 194 controls the fourth delay time between de-assertion of the gate pulse control 180 and when the second solid-state switch 158 changes between the conductive state and the non-conductive state.

The resistance value $R_{g1\_on}$ of the first on-control resistor 182 and the resistance value $R_{g2\_on}$ of the second on-control resistor 192 are selected to cause the third delay time to be the same as the first delay time, thus providing for the first solid-state switch 156 and the second solid-state switch 158 to change between the non-conductive state and the conductive state at a same time after assertion of the gate pulse control 180. Similarly, the resistance value $R_{g1\_off}$ of the first off-control resistor 184 and the resistance value $R_{g2\_off}$ of the second on-control resistor 194 are selected to cause the fourth delay time to be the same as the second delay time, thus providing for the first solid-state switch 156 and the second solid-state switch 158 to change between the conductive state and the non-conductive state at a same time after de-assertion of the gate pulse control 180. These same delay times may be referred to as synchronization between the solid-state switches 156, 158. In other words, the gate drivers 172, 176 are each configured to energize and de-energize a corresponding one of the control terminals 174, 176 at different rates to synchronize operation of the solid-state switches 156, 158. In some embodiments, the resistance values $R_{g1\_on}$, $R_{g2\_on}$ of the on-control resistors 182, 192, may be different from one another to compensate for differences in the operation of the corresponding solid-state switches 156, 158. In some embodiments, the resistance values $R_{g1\_off}$, $R_{g2\_off}$ of the off-control resistors 184, 194, may be different from one another to compensate for differences in the operation of the corresponding solid-state switches 156, 158.

The operation of the gate drivers 172, 176 to control the solid-state switches 156, 158 is described in equations (1) through (6), below. Equation (7) expands the definition of a synchronization time $T_{sync}$ to a more general case with N number of solid-state switches connected in parallel.

$$i_g = C_{gs/ge} \frac{dv_g(T_j)}{dt} + C_{gd/gc} \frac{d(v_g(T_j) - v_{ds/ce}(T_j))}{dt} \quad (1)$$

$$v_g = v_{ds/ce}(T_j) - R_g(T_j)i_g - (L_g + L_{s1})\frac{di_g}{dt} \quad (2)$$

$$R_{g,int}(T_j) = \frac{\Delta V_{G,th}(T_j)}{i_G} - R_{g,ext}(T_j) \quad (3)$$

$$\begin{bmatrix} t_{on} = -\tau_{on} \ln\left(1 - \frac{V_{g,th}(T_j)}{V_{gate}(T_j)}\right) \\ t_{off} = -\tau_{off} \ln\left(1 - \frac{V_{g,th}(T_j)}{V_{gate}(T_j)}\right) \end{bmatrix} \quad (4)$$

$$T_{dead} = t_{off} - t_{on} - \frac{V_{on}}{V_{dc}}T_s \quad (5)$$

$$T_{sync} = T_{dead} + t_{on} - t_{off} + \frac{V_{on}}{V_{dc}}T_s \quad (6)$$

$$T_{sync,1-N} = \sum_{n=1} T_{dead,1} + t_{on,1} - t_{off,1} = \sum_{n=2} T_{dead,2} + t_{on,2} - t_{off,2} = \ldots = \sum_{n=N} T_{dead,N} + t_{on,N} - t_{off,N} \quad (7)$$

Index:

| | |
|---|---|
| $R_{g,int}$ | Internal gate resistance |
| $R_{g,ext}$ | External gate resistance |
| $\Delta V_{G,th}$ | Gate threshold difference between two devices |
| $I_g$ | Gate current |
| $t_{on}$, $t_{off}$ | Turn - on and off delay |
| $\tau_{on}$, $\tau_{off}$ | Turn - on and off time constant |
| $V_{gate}$ | Gate voltage during operation |
| $T_{dead}$ | Conventional deadtime |
| $T_{sync}$ | Synchronous time for two parallel devices |
| $T_s$ | Switching period |
| $T_j$ | Junction temperature of the semiconductors |
| $C_{gs/ge}$ | Gate - source or emitter parasitic capacitance |
| $C_{gd/gc}$ | Gate - drain or collector parasitic capacitance |

The internal gate resistances $R_{g,int}$ are characteristics of the physical solid-state switches 156, 158, and the external gate resistances $R_{g,ext}$ are characteristics of the gate drivers 172, 176. A combination of the internal gate resistances $R_{g,int}$ and the external gate resistances $R_{g,ext}$ define the turn-on delay and turn-off delay of the solid-state switches 156, 158 after corresponding rising and falling edges of the gate pulse control 180. The turn-on delay and turn-off delay must be within a minimum limit to avoid overlap between the high-side switch $S_h$ and the corresponding low-side switch $S_l$, which is also called deadtime or conventional deadtime $T_{dead}$. Here, a synchronization time $T_{sync}$ is provided, where the addition of deadtime $T_{dead}$, turn-on time $t_{on}$ and turn-off time $t_{off}$ for each of the solid-state switches 156, 158 connected in parallel will be equal to each other as shown in equation (6), above.

A gate current between one of the gate drivers 172, 176 and a corresponding one of the control terminals 174, 178 depends on the conducting current and gate voltages. Also, the parasitic capacitance at the one of the control terminals 174, 178 has major influence on the gate current deviation in equation (1). The gate voltage is identified based on the gate current calculated in equation (2). Following, considering an external resistance and gate threshold voltage difference between two devices, internal resistance has been determined in equation (3), which is used to calculate switching delay in equation (4). A regular deadtime model is shown in equation (5). Subsequently, the deadtime model is being modified in equations (6) and (7), where a new coefficient $T_{sync}$ is introduced. The coefficient is mostly depending on the switching delay to set the lower boundary and the $T_{dead}$ is optimized to adjust the synchronous time.

Figure 14:
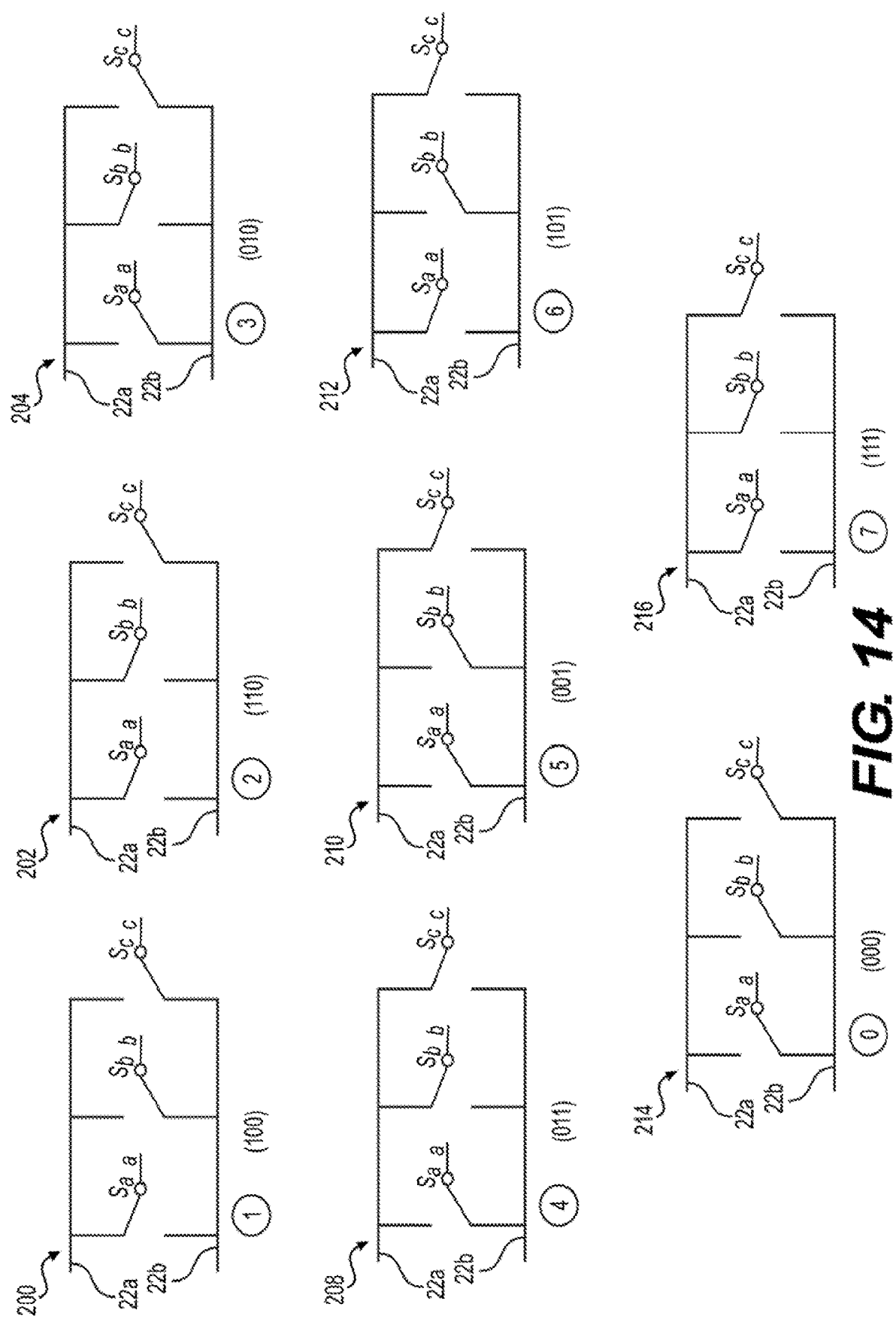
FIG. 14 is a schematic diagram showing different switching states of a three-phase inverter.

FIG. 14 is a schematic diagram showing different switching states 200-216 of a three-phase inverter, and which each have a corresponding vector identification (the circled number 0-7). Specifically, each of the switching states defines a position for each of three switches $S_a$, $S_b$, $S_c$ to conduct current between a corresponding one of the output terminals a, b, c, and either the high-side conductor 22a or the low-side conductor. The first through sixth switching states 200-212 are called active voltage vectors 1, 2, 3, 4, 5, 6, and the remaining two of the switching states 214, 216 are referred to as zero voltage vectors 0, 7, because they each cause the voltages in all three of the output terminals a, b, c, to be equal, thereby causing no voltage difference between any of the output terminals a, b, c.

The switching states 200-216, and associated control methods, such as space vector pulse-width modulation (SVPWM) or near state pulse-width modulation (NSPWM), may also be used with the nine-switch invertor, such as the ones shown in FIGS. 10-11, for example, by corresponding assertions and de-assertions of the gate control signals 90a, 90b, 90c. For example, active voltage vector 2, shown as switching state 202 on FIG. 12 may correspond to assertion of the a-phase and b-phase gate control signals 90a, 90b, and de-assertion of the c-phase gate control signal 90c.

Figure 15:
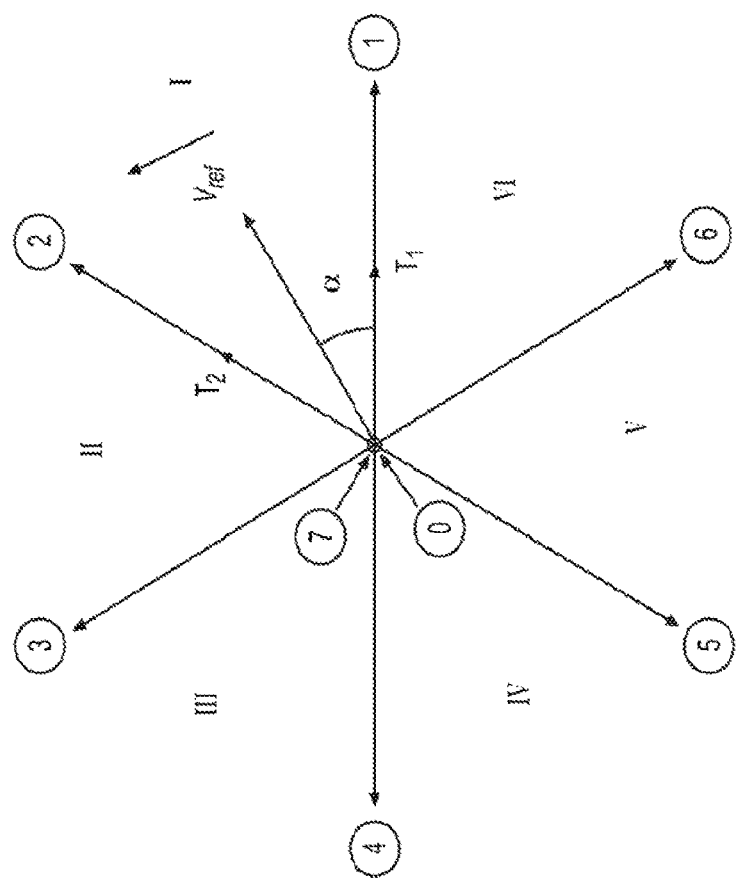
FIG. 15 is a graph showing inverter output voltage space vectors.

FIG. 15 is a graph showing inverter output voltage space vectors, based upon a space vector representation of the voltages in an α, β plane, where the α, β components are found by a Clark transform. The six active voltage vectors 1, 2, 3, 4, 5, and 6 define six sectors I, II, III, IV, V, and VI, each defining a 60-degree range between two adjacent ones of the active voltage vectors 1, 2, 3, 4, 5, 6. In some embodiments, the switching transistors within the inverter 126, 126', 126" may be controlled using the SVPWM control method to generate an output voltage vector $V_{ref}$ within any of the sectors I, II, III, IV, V, and VI, by controlling the switching transistors in a sequence that uses the two active voltage vectors 1, 2, 3, 4, 5, and 6 that define the boundary of the one of the sectors I, II, III, IV, V, VI, that contains output voltage vector $V_{ref}$, in addition to one or more of the zero voltage vectors 0, 7. For example, and with reference to FIG. 15 the example output voltage vector $V_{ref}$ within the first sector I may be produced on the output terminals a, b, c, by switching the switches $S_a$, $S_b$, $S_c$ of the three-phase inverter in a pattern using the first and second active voltage vectors 1, 2, and the two zero voltage vectors 0, 7. In some embodiments, each change in switching state may include changing the state of only one of the three switches $S_a$, $S_b$, $S_c$. Thus, the SVPWM algorithm may use both of the zero voltage vectors 0, 7. The time spent at each of the zero voltage vectors 0, 7 may be evenly divided before and after the time spent at each of two of the active voltage vectors 1, 2, 3, 4, 5, 6. For example, the SVPWM algorithm may use a 0,1,2,7-7,2,1,0 sequence in the first sector I. This sequence extends for two sampling time intervals, with the second sampling time interval having a switching pattern that is the reverse order of the switching pattern in the first sampling time interval. Each of the two sampling time intervals, thus includes four different switching states 214, 200, 202, 216 to produce the two active voltage vectors 1, 2, and the two zero voltage vectors 0, 7. Three different changes of the switching states 214, 200, 202, 216, or commutations, are used within each sampling time interval to define each sequence in the SVPWM algorithm.

Figure 16:
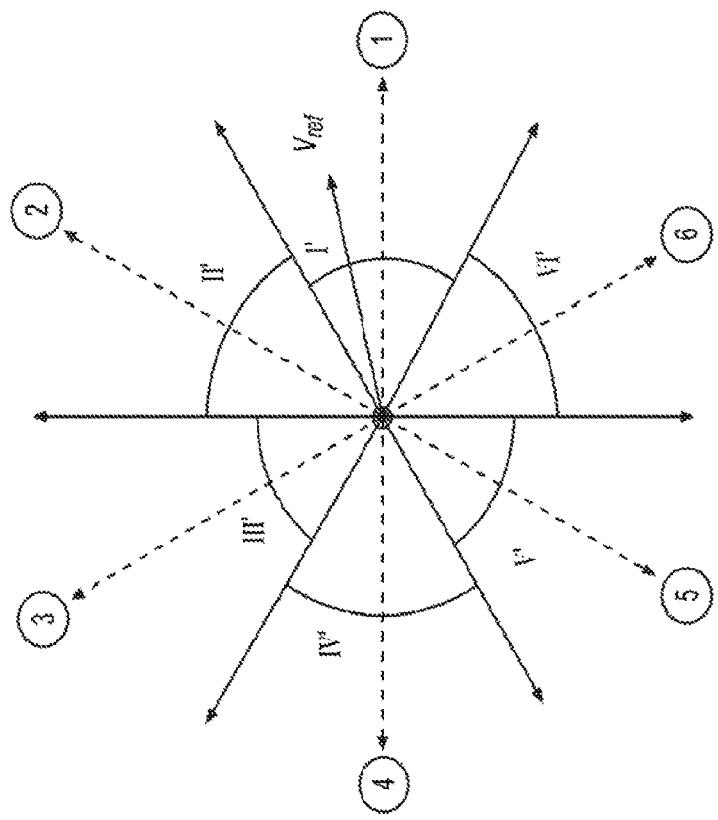
FIG. 16 is a graph showing inverter output voltage space vectors with near-state control sectors.

FIG. 16 is a graph showing inverter output voltage vectors with near-state control sectors I', II', III', IV', V', VI', which are each defined by and centered-around a corresponding one of the active voltage vectors 1, 2, 3, 4, 5, 6. In some embodiments, each of the phase drivers 134a, 134b, 134c, 144a, 144b, 144c is controlled to generate an output voltage vector upon a corresponding one of the one or more output terminals 74, 78 using the NSPWM control method, which may also be called an NSPWM algorithm. Specifically, the NSPWM control method may include switching the one or more output terminals 74, 78 between a nearest-one of the active voltage vectors 1, 2, 3, 4, 5, 6 having an angle closest to the output voltage vector $V_{ref}$ (i.e. the one of the active voltage vectors 1, 2, 3, 4, 5, 6 associated with the one of the control sectors I', II', III', IV', V', VI' where the output voltage vector $V_{ref}$ is located), and two neighboring active voltage vectors on either angular side of the nearest-one of the active voltage vectors 1, 2, 3, 4, 5, 6. For example, the NSPWM algorithm may use a 2,1,6-6,1,2 sequence in the first control sector I'. Two different changes of the switching states 202, 200, 212, or commutations, are made within each sampling time interval to define each sequence in the NSPWM algorithm. Also, the NSPWM algorithm includes switching the one or more output terminals 74, 78 only to active voltage vectors 1, 2, 3, 4, 5, 6 and not to either of the zero voltage vectors 0, 7 in order to generate the output voltage vector $V_{ref}$ having a non-zero scalar value.

The present disclosure provides a motor drive for providing AC power to an electric motor, the motor drive comprising: a battery bus for connection to a battery and defining a positive source node and a reference source node and configured to provide DC electrical power having a substantially constant voltage; a voltage-to-current (V-I) converter operable in a traction mode to receive the first DC electrical power from the battery bus and to supply DC electrical power having a substantially constant current upon a DC link bus; a current-source inverter (CSI) including a plurality of solid-state switches configured to generate an AC power upon one or more motor leads by selectively switching the second DC electrical power from the V-I converter; wherein the V-I converter is operable in a charging mode to receive power from the DC link bus and to supply power to the battery bus; and wherein each of the solid-state switches in the current-source inverter are wide-bandgap (WBG) devices having a bandgap greater than 2.0 electron-volts (eV).

In some embodiments, the motor drive of the preceding section may further comprise: wherein each of the solid-state switches in the current-source inverter has a bandgap of between 2 and 4 electron-volts (eV).

In some embodiments, the motor drive of any of the preceding sections may further comprise: wherein each of the solid-state switches in the current-source inverter are Silicon carbide (SiC) transistors.

In some embodiments, the motor drive of any of the preceding sections may further comprise: wherein each of the solid-state switches in the current-source inverter are Gallium nitride (GaN) transistors.

In some embodiments, the motor drive of any of the preceding sections may further comprise: wherein the V-I converter is configured to boost a first DC voltage from the DC link bus to a second DC voltage upon the battery bus in the charging mode, with the second DC voltage greater than the first DC voltage.

In some embodiments, the motor drive of any of the preceding sections may further comprise: wherein the second DC voltage is at least two-times the first DC voltage.

In some embodiments, the motor drive of any of the preceding sections may further comprise: wherein the V-I converter includes a quasi-Z-Source (qZS).

In some embodiments, the motor drive of any of the preceding sections may further comprise: wherein the quasi-Z-Source (qZS) comprises: a DC Bus inductor defining a first lead and a second lead, with the first lead connected to the positive source node of the battery bus; a first winding defining a first lead and a second lead; a second winding defining a first lead and a second lead; a first capacitor defining a first terminal and a second terminal; and a rectifier defining an input terminal and an output terminal.

In some embodiments, the motor drive of any of the preceding sections may further comprise: a second capacitor defining a first terminal and a second terminal; wherein the first winding and the second winding are each inductors; and wherein the quasi-Z-Source inverter (qZSI) includes: the reference source node of the battery bus connected to a low-side conductor of the DC link bus; the second lead of the DC bus inductor connected to a high-side conductor of the DC link bus and to the first lead of the first winding; the second lead of the first winding defining a first internal node; the first terminal of the first capacitor connected to the first internal node, and the second terminal of the first capacitor connected to the low-side conductor of the DC link bus; the output terminal of the rectifier connected to the first internal node, and the input terminal of the rectifier defining a second internal node; the first terminal of the second capacitor connected to the high-side conductor of the DC link bus, and the second terminal of the second capacitor connected to the second internal node; the first lead of the second winding connected to the second internal node, and the second lead of the second winding connected to the low-side conductor of the DC link bus.

In some embodiments, the motor drive of any of the preceding sections may further comprise: a second capacitor defining a first terminal and a second terminal; wherein the first winding and the second winding are each inductors; and wherein the quasi-Z-Source inverter (qZSI) includes: the second lead of the DC bus inductor defining a first internal node; the first lead of the first winding connected to the first internal node, and the second lead of the first inductor connected to a high-side conductor of the DC link bus; the first terminal of the first capacitor connected to the first internal node, and the second terminal of the first capacitor connected to the low-side conductor of the DC link bus; the output terminal of the rectifier connected to the first internal node, and the input terminal of the rectifier connected to the reference source node of the battery bus; the first terminal of the second capacitor connected to the high-side conductor of the DC link bus, and the second terminal of the second capacitor connected to the reference source node of the battery bus; the first lead of the second winding connected to the reference source node of the battery bus, and the second lead of the second winding connected to the low-side conductor of the DC link bus.

In some embodiments, the motor drive of any of the preceding sections may further comprise: wherein the first winding and the second winding are magnetically coupled as a transformer having a n:1 turns ratio, where n is an integer number; and wherein the quasi-Z-Source inverter (qZSI) includes: the reference source node of the battery bus connected to a low-side conductor of the DC link bus; the second lead of the DC bus inductor connected to a high-side conductor of the DC link bus and to the first lead of the first winding; the second lead of the first winding defining a first internal node; the first terminal of the first capacitor connected to the first internal node, and the second terminal of the first capacitor connected to the low-side conductor of the DC link bus; the first lead of the second winding connected to the first internal node, and the second lead of the second winding defining a second internal node; the output terminal of the rectifier connected to the second internal node, and the input terminal of the rectifier connected to the low-side conductor of the DC link bus.

In some embodiments, the motor drive of any of the preceding sections may further comprise: wherein the first winding and the second winding are magnetically coupled as a transformer having a 1:n turns ratio, where n is an integer number; and wherein the quasi-Z-Source inverter (qZSI) includes: the reference source node of the battery bus connected to a low-side conductor of the DC link bus; the second lead of the DC bus inductor defining a first internal node; the first lead of the first winding connected to the first internal node, and the second lead of the first winding defining a second internal node; the first lead of the second winding connected to the second internal node, and the second lead of the second winding connected to a high-side conductor of the DC link bus; the output terminal of the rectifier connected to the first internal node, and the input terminal of the rectifier connected to the low-side conductor of the DC link bus; and the first terminal of the first capacitor connected to the second internal node, and the second terminal of the first capacitor connected to the low-side conductor of the DC link bus.

In some embodiments, the motor drive of any of the preceding sections may further comprise: wherein the rectifier includes a diode, and wherein the input terminal is an anode of the diode and the output terminal is a cathode of the diode.

In some embodiments, the motor drive of any of the preceding sections may further comprise: wherein the rectifier includes a bidirectionally conducting, unidirectionally blocking switch.

The present disclosure also provides motor drive for providing AC power to an electric motor, the motor drive comprising: a direct current (DC) voltage source configured to provide a first DC electrical power having a substantially constant voltage; a DC link bus including a high-side conductor and a low-side conductor; a nine-switch inverter coupled to the DC link bus and including nine solid-state switches configured to generate 3-phase AC power upon a first set of motor leads to supply a first winding set within the electric motor, the nine solid-state switches in the inverter also configured to generate 3-phase AC power upon a second set of motor leads to supply a second winding set within the electric motor; wherein the nine-switch inverter includes: an a-phase high switch configured to selectively conduct current between the high-side conductor and a first motor lead of the first set of motor leads; a b-phase high switch configured to selectively conduct current between the high-side conductor and a second motor lead of the first set of motor leads; a c-phase high switch configured to selectively conduct current between the high-side conductor and a third motor lead of the first set of motor leads; an a-phase low switch configured to selectively conduct current between the low-side conductor and a first motor lead of the second set of motor leads; a b-phase low switch configured to selectively conduct current between the low-side conductor and a second motor lead of the second set of motor leads; a c-phase low switch configured to selectively conduct current between the low-side conductor and a third motor lead of the second set of motor leads; an a-phase middle switch configured to selectively conduct current between the first motor lead of the first set of motor leads and the first motor lead of the second set of motor leads; a b-phase middle switch configured to selectively conduct current between the second motor lead of the first set of motor leads and the second motor lead of the second set of motor leads; and a c-phase middle switch configured to selectively conduct current between the third motor lead of the first set of motor leads and the third motor lead of the second set of motor leads; and wherein the nine-switch inverter is configured to be operated in a rectifier mode to convert the 3-phase AC electrical current from each of the first and second sets of motor leads to supply DC power to the DC voltage source via the DC link bus.

In some embodiments, the motor drive the preceding section may further comprise: wherein each of the solid-state switches in the nine-switch inverter are wide-bandgap (WBG) devices having a bandgap greater than 2.0 electron-volts (eV).

In some embodiments, the motor drive of any of the preceding sections may further comprise: wherein each of the solid-state switches in the nine-switch inverter are Silicon carbide (SiC) transistors.

In some embodiments, the motor drive of any of the preceding sections may further comprise: wherein each of the solid-state switches in the nine-switch inverter are Gallium nitride (GaN) transistors.

In some embodiments, the motor drive of any of the preceding sections may further comprise: wherein the nine-switch inverter is configured to supply the 3-phase AC power upon the second set of motor leads having a phase difference of 180 degrees from the 3-phase AC power upon the first set of motor leads.

In some embodiments, the motor drive of any of the preceding sections may further comprise: wherein the nine-switch inverter is configured to supply the 3-phase AC power upon the second set of motor leads having an opposite polarity to the first set of motor leads.

A motor drive system for an electrified vehicle includes a battery bus for connection to a battery and a voltage-to-current (V-I) converter, operable to transfer power from the battery bus to an electric motor or in a charging mode to supply power to the battery bus. A current-source inverter (CSI) includes a plurality of wide-bandgap (WBG) switches, such as Silicon carbide (SiC) or Gallium nitride (GaN) devices configured to generate an AC power upon one or more motor leads by selectively switching DC electrical power from a DC link bus connected to the V-I converter. The V-I converter may include a quasi-Z-Source (qZS) and may boost a first DC voltage from the DC link bus to a larger DC voltage upon the battery bus. A motor drive including a nine-switch inverter (NSI) with WBG switches may be operated in either an inverter mode or a rectifier mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inverter for converting between DC and AC power, comprising:
    a DC link bus including a high-side conductor and a low-side conductor;
    a phase driver configured to switch current from the DC link bus to generate the AC power upon an output terminal;
    wherein the output terminal is one of a plurality of output terminals including a first output terminal and a second output terminal;
    wherein the phase driver includes:
        a high switch configured to selectively conduct current between the high-side conductor and the first output terminal;
        a low switch configured to selectively conduct current between the low-side conductor and the second output terminal; and
        a middle switch configured to selectively conduct current between the first output terminal and the second output terminal; and
    wherein at least one of the high switch, the low switch, and the middle switch has a first voltage rating, and at least one of the high switch, the low switch, and the middle switch has a second voltage rating higher than the first voltage rating, and
    wherein the phase driver is one of three phase drivers; and wherein each of the three phase drivers is controlled to generate an output voltage vector upon the output terminal using a near state pulse-width modulation (NSPWM) control method.

2. The inverter of claim 1, wherein the middle switch has the first voltage rating, and wherein the high switch or the low switch has the second voltage rating higher than the first voltage rating.

3. The inverter of claim 1, wherein the at least one of the high switch, the low switch, and the middle switch having the second voltage rating includes a wide-bandgap (WBG) device having a bandgap greater than 2.0 electron-volts (eV).

4. The inverter of claim 1, wherein the at least one of the high switch, the low switch, and the middle switch having the first voltage rating includes one of an insulated gate bipolar transistor (IGBT) or a metal-oxide-semiconductor field-effect transistor (MOSFET).

5. The inverter of claim 1, wherein the at least one of the high switch, the low switch, and the middle switch having the first voltage rating includes a silicon metal-oxide-semiconductor field-effect transistor (Si-MOSFET), and wherein the first voltage rating is less than 400 volts.

* * * * *